US011326953B2

(12) United States Patent
Kawasaki

(10) Patent No.: US 11,326,953 B2
(45) Date of Patent: May 10, 2022

(54) OPTICAL CHARACTERISTIC MEASUREMENT DEVICE

(71) Applicant: Konica Minolta, Inc., Tokyo (JP)

(72) Inventor: Takashi Kawasaki, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/051,842

(22) PCT Filed: Apr. 15, 2019

(86) PCT No.: PCT/JP2019/016203
§ 371 (c)(1),
(2) Date: Oct. 30, 2020

(87) PCT Pub. No.: WO2019/244458
PCT Pub. Date: Dec. 26, 2019

(65) Prior Publication Data
US 2021/0239532 A1 Aug. 5, 2021

(30) Foreign Application Priority Data

Jun. 20, 2018 (JP) .............................. JP2018-116911

(51) Int. Cl.
*G01J 3/50* (2006.01)
*G01J 3/02* (2006.01)
(Continued)

(52) U.S. Cl.
CPC ............... *G01J 3/50* (2013.01); *G01J 3/0251* (2013.01); *G01J 3/463* (2013.01); *G01N 21/57* (2013.01); *G01N 2201/065* (2013.01)

(58) Field of Classification Search
CPC ............ G01J 3/50; G01J 3/0251; G01J 3/463; G01N 21/57; G01N 2021/575
See application file for complete search history.

(56) References Cited

U.S. PATENT DOCUMENTS

2014/0350895 A1 11/2014 Kettler et al.

FOREIGN PATENT DOCUMENTS

JP 2017019395 * 5/2017 ............. G01N 21/57
WO 2017/208937 A1 12/2017

OTHER PUBLICATIONS

International Search Report (ISR) dated Jul. 2, 2019 filed in PCT/JP2019/016203.
(Continued)

*Primary Examiner* — Maurice C Smith
(74) *Attorney, Agent, or Firm* — Rankin, Hill & Clark LLP

(57) ABSTRACT

An optical characteristic measurement device has a measurement opening, includes a first optical measurement unit and a second optical measurement unit that measure different optical characteristics with different geometries with respect to a measurement target facing the measurement opening, and further includes a processing unit that corrects a measurement value obtained in the second optical measurement unit based on a measurement value obtained in the first optical measurement unit. The first optical measurement unit includes an illumination optical system that illuminates the measurement target facing the measurement opening, a first light receiving optical system that collects light reflected by the measurement target, and a first light receiving unit that receives light collected by the first light receiving optical system and outputs the light as a measurement signal, and has a diffuse reflection surface that diffuses and reflects incident light to the illumination optical system or the first light receiving optical system. The second optical measurement unit includes a light projecting optical system that projects light from a direction inclined by a predetermined angle with respect to a normal line of a measurement surface of the measurement target facing the measurement (Continued)

opening, a second light receiving optical system that collects light reflected by the measurement target in a regular reflection direction, and a second light receiving unit that receives light collected by the second light receiving optical system and outputs the light as a measurement signal.

13 Claims, 29 Drawing Sheets

(51) Int. Cl.
*G01J 3/46* (2006.01)
*G01N 21/57* (2006.01)

(56) References Cited

OTHER PUBLICATIONS

PCT Written Opinion of the International Searching Authority dated Jul. 2, 2019 filed in PCT/JP2019/016203.

* cited by examiner

OPTICAL CHARACTERISTIC MEASUREMENT DEVICE

TECHNICAL FIELD

The present invention relates to an optical characteristic measurement device, for example, an optical characteristic measurement device in which a colorimeter and a glossmeter are integrated.

BACKGROUND ART

In recent years, there is a demand for measuring a plurality of optical characteristics in a device that evaluates optical characteristics of an object surface. In order to meet the demand, for example, a measurement device in which a colorimeter and a 60° glossmeter (60° illumination/60° light reception) are integrated has been developed. In such an integrated measurement device, for example, when diffused light/8° geometry (diffused light illumination, 8° light reception) is adopted for the colorimeter, it is necessary to illuminate a measurement surface with uniform diffused light. For uniform diffused light illumination, in many cases, a highly reflective diffuse reflection surface disposed so as to surround a measurement surface (for example, an integrating sphere) is used. By illuminating the diffuse reflection surface with a light source, the measurement surface can be indirectly illuminated with diffused light.

When a 60° glossmeter is integrated with a colorimeter having such a diffuse reflection surface as described above in an illumination optical system, the glossmeter illuminates the measurement surface with substantially parallel light coming from a light projecting optical system. Therefore, for example, if the measurement surface is a rough surface, diffuse reflection occurs. Apart of light diffused and reflected by the measurement surface enters the illumination optical system having the diffuse reflection surface, and light reflected by the diffuse reflection surface re-illuminates the measurement surface (retro-diffusive illumination). This re-illumination does not occur in a general glossmeter having no diffuse reflection surface in an illumination optical system (that is, having no integrating sphere or the like). Therefore, when the same measurement target is measured with a glossmeter having a diffuse reflection surface in an illumination optical system, a measurement error occurs. Patent Literature 1 proposes a measurement device intended to solve this problem.

CITATION LIST

Patent Literature

Patent Literature 1: WO 2017-208937 A1

SUMMARY OF INVENTION

Technical Problem

Patent Literature 1 describes a measurement device including a correction light source and a correction sensor in an illumination optical system having a diffuse reflection surface, the measurement device estimating a re-illumination light amount from a correction sensor output and a gloss sensor output when the correction light source emits light, and a correction sensor output and a gloss sensor output when a glossmeter light source emits light and correcting a gloss value. However, in this measurement device, it is necessary to mount an additional light source and sensor in the illumination optical system, which may lead to a complicated device configuration and is disadvantageous also in terms of cost.

Another measurement device described in Patent Literature 1 stores a relationship between a colorimetric sensor output and a gloss sensor output when a colorimeter light source emits light in advance, and determines a correction amount of a gloss value from the relationship between the sensor outputs and a colorimetric sensor output when a glossmeter light source emits light to execute correction. On this measurement device, an additional light source and sensor do not need to be mounted. However, the colorimetric sensor does not assume the amount of light received when a gloss light source emits light. Therefore, depending on the configuration of the illumination optical system (for example, in a case where a large integrating sphere is used), when the gloss light source emits light, the colorimetric sensor cannot obtain the amount of light necessary for correction, and correction accuracy may decrease.

The present invention has been achieved in view of such a situation, and an object of the present invention is to provide an optical characteristic measurement device capable of measuring a plurality of optical characteristics, and capable of performing highly accurate measurement even if retro-diffusive illumination occurs on a measurement surface by a diffuse reflection surface used in measurement of other optical characteristics in measurement of a predetermined optical characteristic.

Solution to Problem

In order to achieve the above object, the optical characteristic measurement device of the present invention has a measurement opening and includes a first optical measurement unit and a second optical measurement unit that measure different optical characteristics with different geometries with respect to a measurement target facing the measurement opening, in which the first optical measurement unit includes an illumination optical system that illuminates the measurement target facing the measurement opening, a first light receiving optical system that collects light reflected by the measurement target, and a first light receiving unit that receives light collected by the first light receiving optical system and outputs the light as a measurement signal, and has a diffuse reflection surface that diffuses and reflects incident light to the illumination optical system or the first light receiving optical system, and the second optical measurement unit includes a light projecting optical system that projects light from a direction inclined by a predetermined angle with respect to a normal line of a measurement surface of the measurement target facing the measurement opening, a second light receiving optical system that collects light reflected by the measurement target in a regular reflection direction, and a second light receiving unit that receives light collected by the second light receiving optical system and outputs the light as a measurement signal, the optical characteristic measurement device further including a processing unit that corrects a measurement value obtained in the second optical measurement unit based on a measurement value obtained in the first optical measurement unit.

Advantageous Effects of Invention

The present invention can achieve an optical characteristic measurement device capable of measuring a plurality of optical characteristics, and capable of performing highly accurate measurement even if retro-diffusive illumination occurs on a measurement surface by a diffuse reflection surface used in measurement of other optical characteristics in measurement of a predetermined optical characteristic. For example, since a measurement value obtained in the second optical measurement unit is corrected based on a measurement value obtained in the first optical measurement unit, it is not necessary to dispose a light source or a sensor separately for correction, and shortage of the amount of illumination light that causes a decrease in correction accuracy does not occur. Therefore, in the measurement of the optical characteristics by the second optical measurement unit, highly accurate measurement can be performed at low cost even if retro-diffusive illumination on a measurement surface occurs by a diffuse reflection surface used in measurement of optical characteristics with the first optical measurement unit.

DESCRIPTION OF EMBODIMENTS

Figure 1:
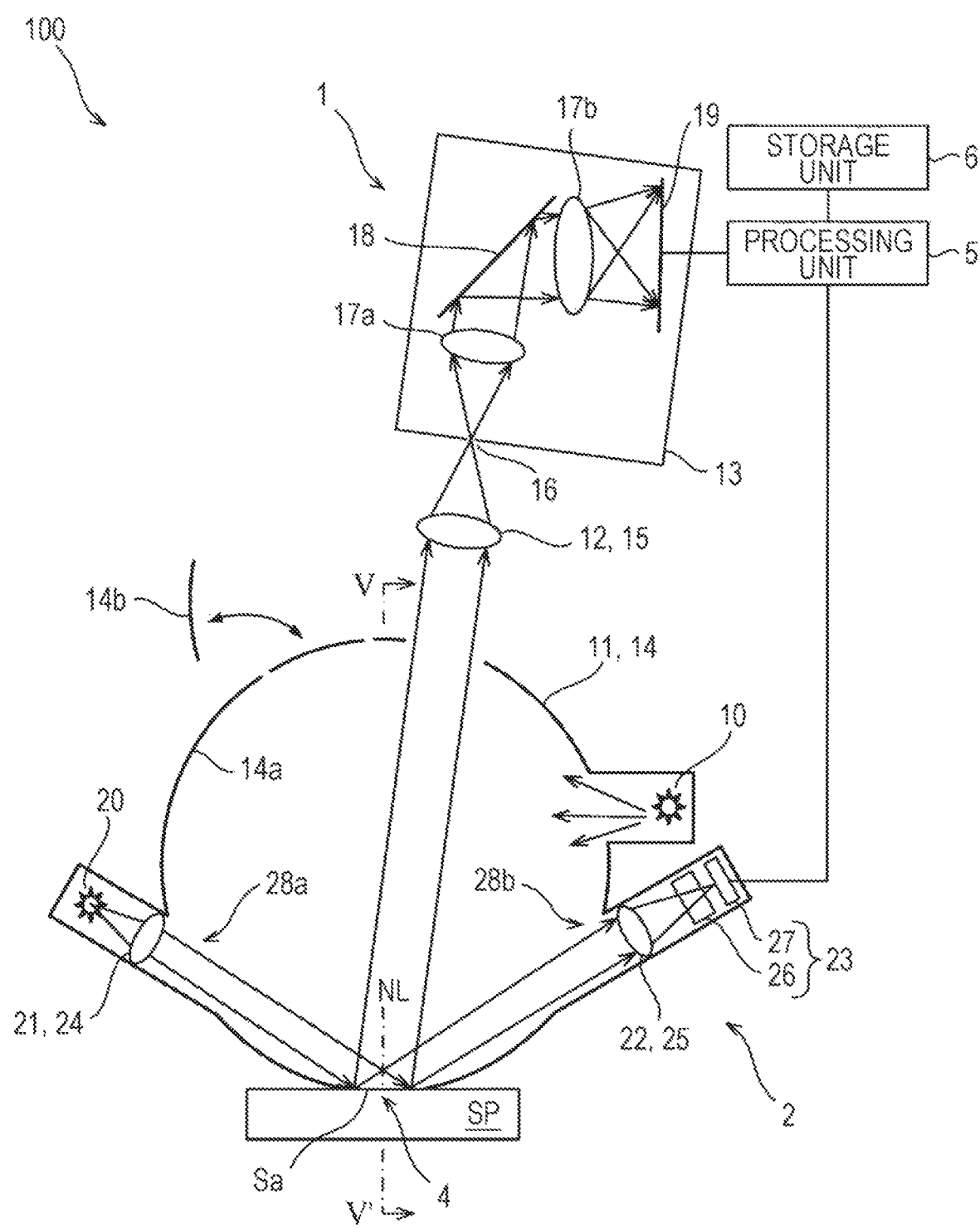
FIG. 1 is a schematic cross-sectional view illustrating an embodiment of an optical characteristic measurement device.

Hereinafter, an optical characteristic measurement device and the like according to an embodiment of the present invention will be described with reference to the drawings. Note that the same parts or corresponding parts in the embodiment, Specific Examples, and the like are designated by the same reference numerals, and duplicate description will be appropriately omitted.

Figure 2:
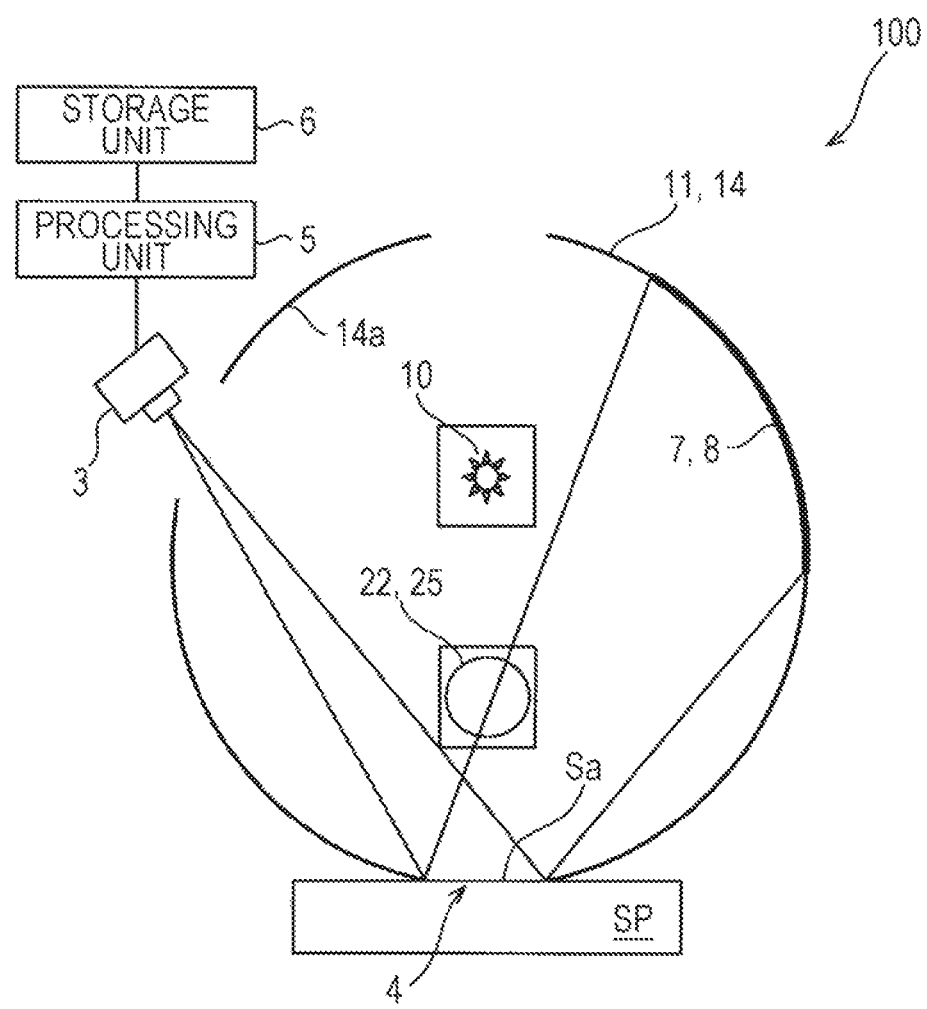
FIG. 2 is a cross-sectional view taken along V-V' of FIG. 1.

FIG. 1 illustrates a schematic configuration of an optical characteristic measurement device 100 according to an embodiment of the present invention in a vertical cross section, and FIG. 2 illustrates a schematic structure of a cross section taken along V-V'(longitudinal cross section in an orthogonal direction of FIG. 1). The optical characteristic measurement device 100 has a measurement opening 4, and includes a first optical measurement unit and a second optical measurement unit that measure different optical characteristics with different geometries with respect to a measurement target SP facing the measurement opening 4. Here, it is assumed that a colorimeter 1 with diffused light/8° geometry that measures a spectral reflectance (color value) as an optical characteristic is the first optical measurement unit, and a glossmeter 2 with 60° incident angle that measures a gloss value as an optical characteristic is the second optical measurement unit. As described above, the optical characteristic measurement device 100 has a compact configuration in which the colorimeter 1 and the glossmeter 2 are integrated, and makes it possible to improve work efficiency by simultaneously measuring the color and the gloss.

The optical characteristic measurement device 100 includes a processing unit 5, a storage unit 6, and the like. The processing unit 5 can calculate and determine a color value and a gloss value from measurement signals obtained by the colorimeter 1 and the glossmeter 2, and the storage unit 6 can store a correction table, a relational expression, and the like necessary for the calculation. The processing unit 5, the storage unit 6, and the like each include, for example, a central processing unit (CPU), a random access memory (RAM), a read only memory (ROM), or a hard disk drive (HDD). Note that a server or the like may include the storage unit 6 via a network, which makes it possible to facilitate management by accumulating a large amount of information.

The colorimeter 1 includes a colorimetric light source 10 that radiates light for illumination, an illumination optical system 11 that illuminates the measurement target SP facing the measurement opening 4, a colorimetric light receiving optical system 12 that collects light reflected by the measurement target SP, and a colorimetric light receiving unit 13 that receives light collected by the colorimetric light receiving optical system 12 and outputs the light as a measurement signal. The illumination optical system 11 includes an integrating sphere 14 and the like, and the integrating sphere 14 has a diffuse reflection surface 14a that diffuses and reflects incident light on an inner wall thereof. The colorimetric light receiving optical system 12 includes a light receiving lens 15 and the like, and the colorimetric light receiving unit 13 includes a light receiving slit 16, lenses 17a and 17b, a diffraction grating 18, a sensor 19, and the like.

The measurement opening 4 is formed in the integrating sphere 14, and the measurement target SP is installed such that a measuring surface (measurement surface Sa) faces an inside of the integrating sphere 14 at the position of the measurement opening 4. When the colorimetric light source 10 emits light, light that has entered the integrating sphere 14 is repeatedly reflected by the inner wall of the integrating sphere 14 and becomes diffused light, which illuminates the measurement surface Sa of the measurement target SP. The colorimetric light receiving optical system 12 receives light reflected from the measuring surface of the measurement target SP in a direction of 8° with respect to a normal line NL of the measurement surface Sa, and forms an image at the position of the light receiving slit 16 of the colorimetric light receiving unit 13.

The colorimetric light receiving unit 13 is a polychromator (spectrometer) and a spectroscopic optical system including the lenses 17a and 17b, the diffraction grating 18, and the like. The colorimeter 1 has a spectral type configuration. Light that has entered the colorimetric light receiving unit 13 from the light receiving slit 16 is guided to the diffraction grating 18 by the lens 17a and is dispersed. The light that has been dispersed by the diffraction grating 18 passes through the lens 17b and forms an image on the sensor 19. The sensor 19 is a line sensor having a plurality of photodiodes arranged in a line. In the sensor 19, the light that has been dispersed by the diffraction grating 18 is received by different photodiodes depending on a wavelength, and the sensor 19 outputs a measurement signal according to the amount of light received by each of the photodiodes. By the calculation in the processing unit 5, a color value of the measurement target SP is calculated as a spectral reflectance from the amount of light received by each of the photodiodes and an optical spectrum of the colorimetric light source 10.

The glossmeter 2 includes a gloss light source 20 that radiates light for projection, a light projecting optical system 21 that projects substantially parallel light from a direction inclined by a predetermined angle with respect to the normal line NL of a measurement surface of the measurement target SP facing the measurement opening 4, a gloss light receiving optical system 22 that collects light reflected by the measurement target SP in a regular reflection direction, and a gloss light receiving unit 23 that receives light collected by the gloss light receiving optical system 22 and outputs the light as a measurement signal. The light projecting optical system 21 includes a light projecting lens 24 and the like. The gloss light receiving optical system 22 includes a light receiving lens 25 and the like. The gloss light receiving unit 23 includes an optical filter 26, a sensor 27, and the like.

The gloss light source 20, the light projecting optical system 21, the gloss light receiving optical system 22, and the gloss light receiving unit 23 are disposed outside the integrating sphere 14 constituting the colorimeter 1. The integrating sphere 14 has a light projecting opening 28a and a light receiving opening 28b through which an optical path of the glossmeter 2 passes. When the gloss light source 20 emits light, the light is collimated by the light projecting lens 24, passes through the light projecting opening 28a, and illuminates the measurement target SP.

Figure 3:
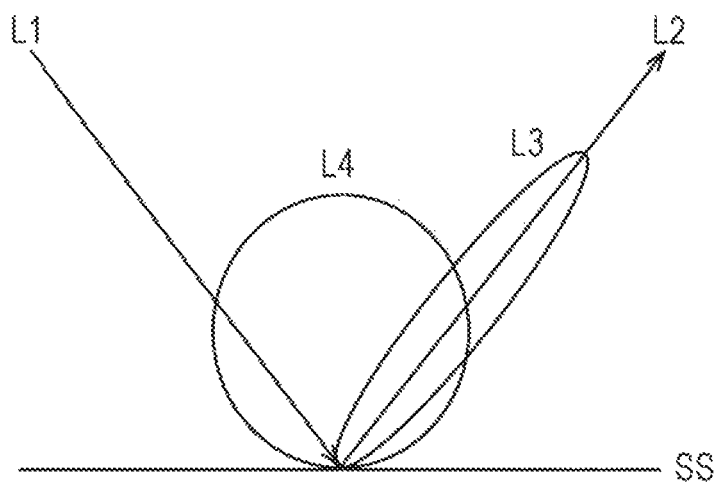
FIG. 3 is a diagram illustrating spread of reflected light generated on a substance surface.

Light reflected by the measurement target SP is divided into Fresnel reflected light on a surface of the measurement target SP and internal diffused reflected light obtained by entering the measurement target SP, being scattered or absorbed inside the measurement target SP, and being radiated from the surface of the measurement target SP. The light is reflected with a surface reflectance, and then a transmission component is reflected with a diffuse reflectance. As illustrated in FIG. 3, when incident light L1 enters a substance surface SS and reflected on the surface, in a case where the substance surface SS is a smooth surface, the incident light L1 is reflected as regular reflected light L2 only in a regular reflection direction. However, depending on the surface roughness of the substance surface SS, surface scattered reflected light L3 that spreads around the regular reflection direction is generated. The surface scattered reflected light L3 is reflected light that spreads at a certain angle around the regular reflected light L2, and is generated when the substance surface SS is not a mirror surface but a rough surface. The internal diffused reflected light L4 is reflected light that complies with Lambert's cosine law and is generated as reflected light that is uniform in all directions regardless of the incident angle of the incident light L1 due to scattering and the like by the inside of the substance.

Out of the light reflected by the measurement target SP, light falling within a light receiving angle range of the light receiving lens 25 enters the optical filter 26 through the light receiving opening 28b and is received by the sensor 27, as illustrated in FIG. 1. The sensor 27 outputs a measurement signal according to the amount of light received. Note that the spectral sensitivity of the glossmeter 2 is determined by the optical filter 26.

Light that does not fall within the light receiving angle range of the light receiving lens 25 enters the integrating sphere 14 of the colorimeter 1. The light that has entered the integrating sphere 14 is repeatedly reflected by an inner wall of the integrating sphere 14, and re-illuminates the measurement target SP as diffused light (retro-diffusive illumination). A general glossmeter not integrated with the colorimeter 1 does not cause retro-diffusive illumination. Therefore, as compared with this, when retro-diffusive illumination occurs, this causes a measurement error to make a measured gloss value high. The optical characteristic measurement device 100 corrects the gloss value (that is, cancels an error due to the retro-diffusive illumination) in the processing unit 5, and a measurement value obtained in the glossmeter 2 is corrected based on a measurement value obtained in the colorimeter 1. The correction method will be described below.

Assuming a dielectric such as glass or plastic as the measurement target SP, modelling of reflection characteristics of the measurement target SP is performed with parameters such as refractive index, surface roughness, and internal diffuse reflectance, and a relationship between a measurement value of the colorimeter 1 and a measurement error due to re-illumination of the glossmeter 2 is determined by simulation. As a result, a relationship approximately like a quadratic function is obtained. At this time, the measurement value of the colorimeter 1 is the sum of an optical spectrum obtained by multiplying a spectral reflectance of the measurement target SP measured by the colorimeter 1 by the light source spectrum of the glossmeter 2 and the transmittance of the optical filter 26. That is, (measurement value of colorimeter 1)=sum of {(spectral reflectance of measurement target SP measured by colorimeter 1)×(light source spectrum of glossmeter 2)×(transmittance of optical filter 26)}. According to this, since the measurement value of the colorimeter 1 is converted into a component of the same optical spectrum as light received by the glossmeter 2, correct correction can be performed.

Specific examples of the correction method include a method for calculating a measurement value of a specific sample by the colorimeter 1 and the glossmeter 2 in advance by actual measurement or simulation, storing a relationship between the measurement value of the specific sample obtained by the colorimeter 1 and a measurement error included in the measurement value of the specific sample obtained by the glossmeter 2 in the storage unit 6 as a correction table or a relational expression, and applying a measurement value of the measurement target SP obtained by the colorimeter 1 to the correction table or the relational expression to determine a correction amount of the measurement value of the glossmeter 2.

That is, the method for determining a correction amount include a method for determining a correction amount from the correction table and a method for determining a correction amount from the relational expression. The method for determining the correction table or the relational expression includes a method by actually measuring a specific sample and a method by simulation. Here, correction of a gloss value will be described with Specific Example 1 in which a correction table for determining a correction amount is created by actually measuring a specific sample and a measurement value of the glossmeter 2 is corrected. Specific Example 2 in which a relational expression for determining a correction amount is created by actually measuring a specific sample and a measurement value of the glossmeter 2 is corrected, and Specific Example 3 in which a relational expression for determining a correction amount is created by simulating a specific sample and a measurement value of the glossmeter 2 is corrected.

Figure 4:
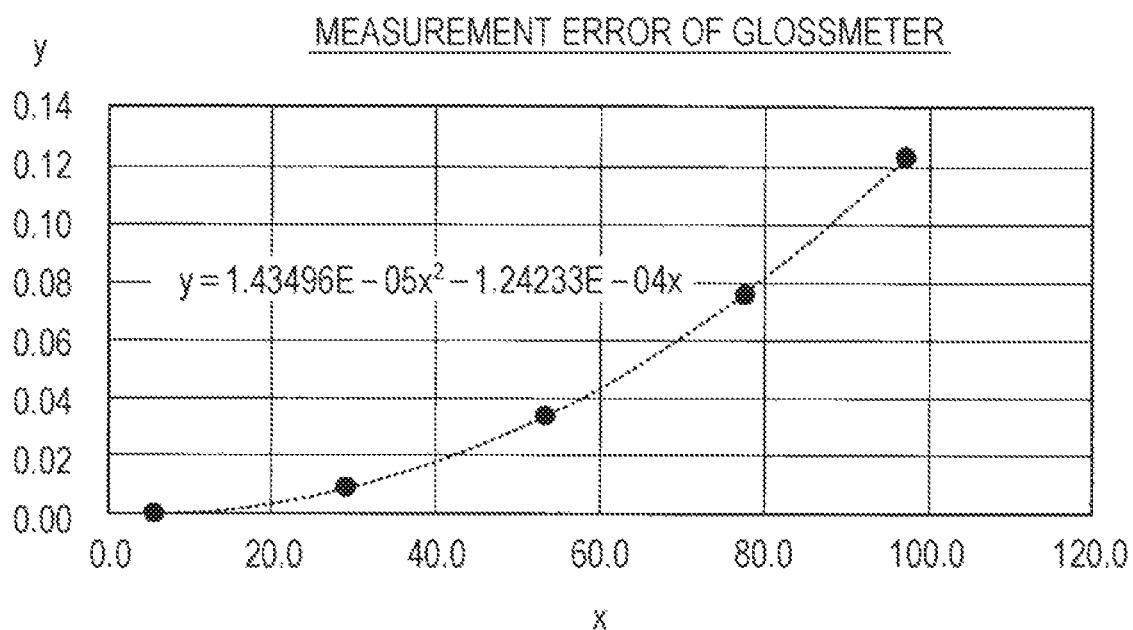
FIG. 4 is a graph illustrating a relationship between a measurement value of a colorimeter and a measurement error of a glossmeter in the optical characteristic measurement device of FIG. 1.

Table 1 illustrates measurement values and the like obtained by actually measuring specific samples S1 to S5 having different reflectances with the colorimeter 1 and the glossmeter 2 mounted on the optical characteristic measurement device 100, and a reference machine (glossmeter not integrated with a colorimeter). The specific samples S1 to S5 are characterized by a reference machine of a glossmeter not integrated with a colorimeter, and a measurement value obtained in the reference machine is A0. The graph of FIG. 4 illustrates a measurement error of the glossmeter 2. A measurement error y of the glossmeter 2 is a difference A1-A0 between a measurement value A1 of the glossmeter 2 and a measurement value A0 of the reference machine, and the graph of FIG. 4 and the relational expression ($y=1.43496\times10^{-5}x^2-1.24233\times10^{-4}x$) indicates a relationship between the measurement error y and a measurement value x of the colorimeter 1. This relationship is stored in the storage unit 6 as a correction table or a relational expression.

TABLE 1

| Specific sample | S1 | S2 | S3 | S4 | S5 |
| --- | --- | --- | --- | --- | --- |
| Measurement value A0 of glossmeter which is reference machine | 102.13 | 101.68 | 101.11 | 100.55 | 100.00 |
| Measurement value A1 of glossmeter 2 in measurement device | 102.25 | 101.75 | 101.15 | 100.56 | 100.00 |
| Measurement value x of colorimeter 1 in measurement device | 97.0 | 77.5 | 53.2 | 29.0 | 5.4 |
| Measurement error y of glossmeter 2 = A1-A0 | 0.12 | 0.08 | 0.03 | 0.01 | 0.00 |

Figure 5:
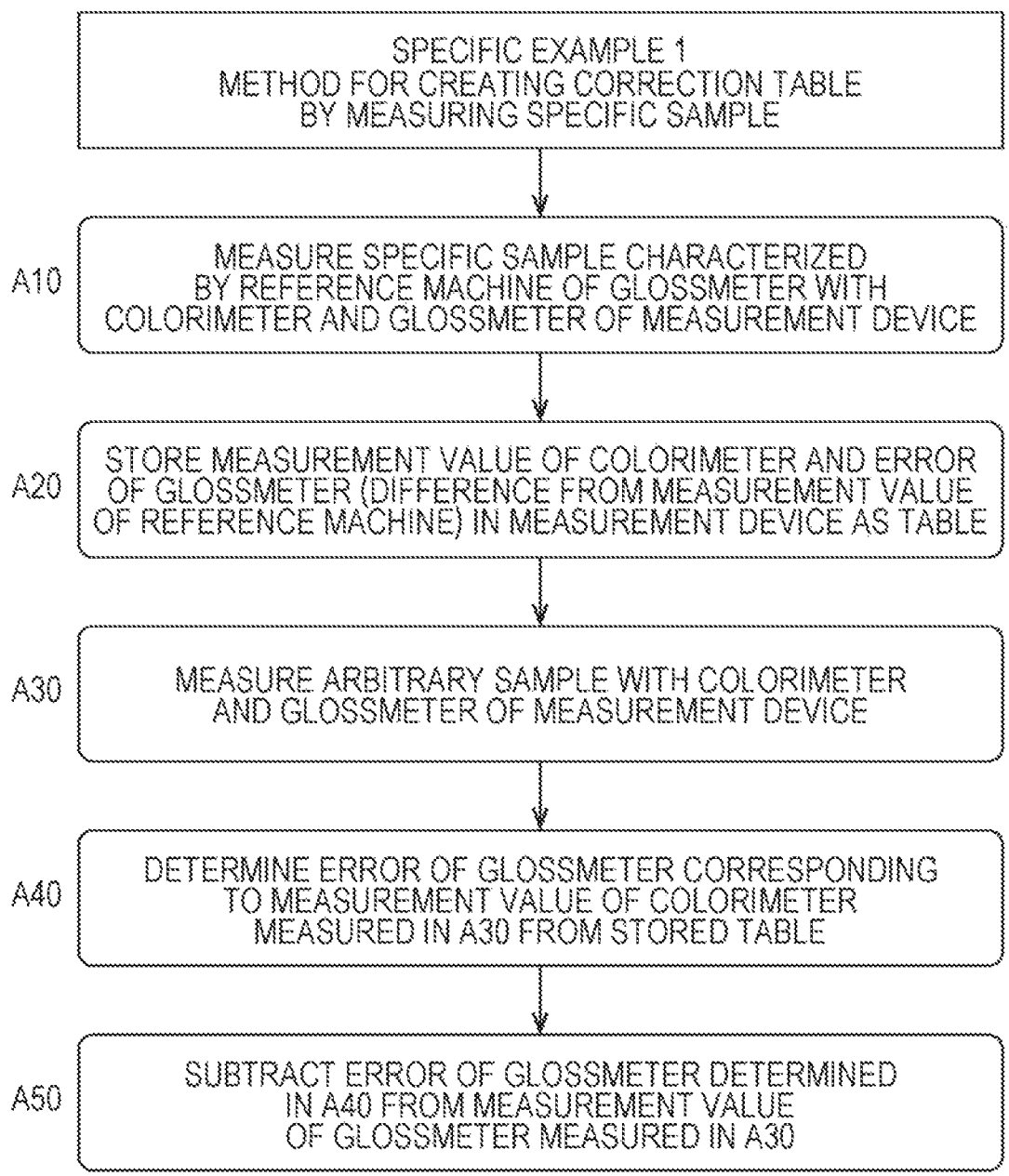
FIG. 5 is a flowchart illustrating a procedure of Specific Example 1 in which a correction table is created by actually measuring a specific sample and a measurement value of a glossmeter is corrected.

The flowchart of FIG. 5 illustrates a procedure of Specific Example 1. First, a spectral reflectance (color value) x of each of the specific samples S1 to S5 and a gloss value A1 thereof are measured with the colorimeter 1 and the glossmeter 2, respectively (A10). Since the specific samples S1 to S5 are characterized by a reference machine of a glossmeter not integrated with a colorimeter, a measurement value x of the colorimeter 1 and a measurement error y of the glossmeter 2 (a difference A1−A0 between a measurement value A1 of the glossmeter 2 and a measurement value A0 of the reference machine) is stored in the storage unit 6 as a correction table (A20). A spectral reflectance and a gloss value of an arbitrary sample that is the measurement target SP are measured with the colorimeter 1 and the glossmeter 2, respectively (A30). The measurement error y of the glossmeter 2 corresponding to the measurement value (A30) of the arbitrary sample with the colorimeter 1 is determined from the correction table (A20) of the storage unit 6 (A40). From the measurement value (A30) of the arbitrary sample with the glossmeter 2, the measurement error (A40) of the glossmeter 2 determined from the correction table is subtracted as a correction amount (A50). In this way, the measurement value obtained in the glossmeter 2 can be corrected based on the correction table including the measurement value x obtained in the colorimeter 1.

Figure 6:
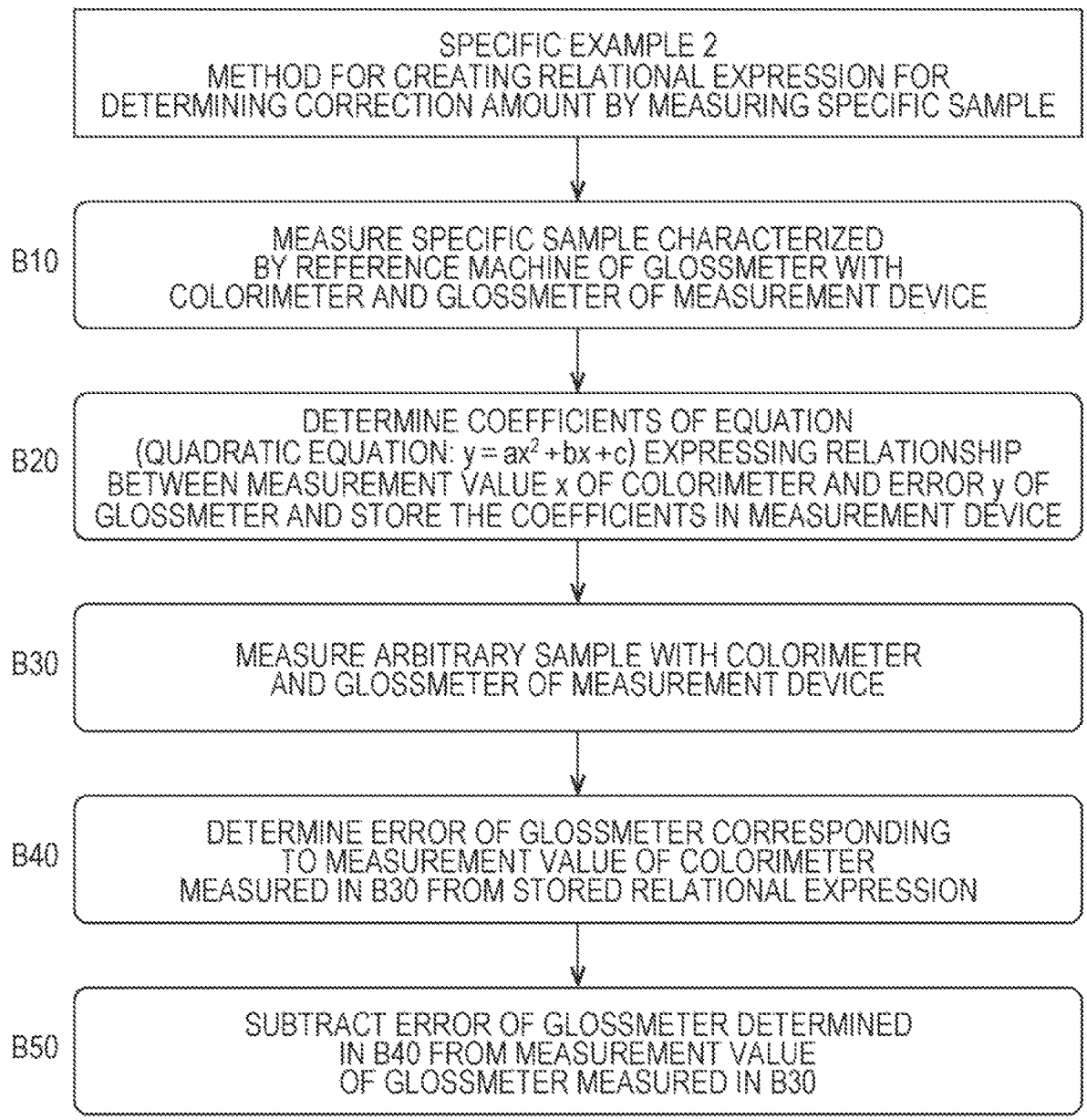
FIG. 6 is a flowchart illustrating a procedure of Specific Example 2 in which a relational expression is created by actually measuring a specific sample and a measurement value of a glossmeter is corrected.

The flowchart of FIG. 6 illustrates a procedure of Specific Example 2. First, a spectral reflectance (color value) x of each of the specific samples S1 to S5 and a gloss value A1 thereof are measured with the colorimeter 1 and the glossmeter 2, respectively (B10). Since the specific samples S1 to S5 are characterized by a reference machine of a glossmeter not integrated with a colorimeter, coefficients a, b, and c of an equation (quadratic equation: $y=ax^2+bx+c$) expressing a relationship between a measurement value x of the colorimeter 1 and a measurement error y of the glossmeter 2 (a difference A1−A0 between a measurement value A1 of the glossmeter 2 and a measurement value A0 of the reference machine) are determined and stored in the storage unit 6 as a relational expression (B20). A spectral reflectance and a gloss value of an arbitrary sample that is the measurement target SP are measured with the colorimeter 1 and the glossmeter 2, respectively (B30). The measurement error y of the glossmeter 2 corresponding to the measurement value (B30) of the arbitrary sample with the colorimeter 1 is determined from the relational expression (B20) of the storage unit 6 (B40). From the measurement value (B30) of the arbitrary sample with the glossmeter 2, the measurement error (B40) of the glossmeter 2 determined from the relational expression is subtracted as a correction amount (B50). In this way, the measurement value obtained in the glossmeter 2 can be corrected based on the relational expression including the measurement value x obtained in the colorimeter 1.

As described above, in Specific Examples 1 and 2, by measuring the plurality of specific samples S1 to S5 having different reflectances with the colorimeter 1 and the glossmeter 2, the measurement value x of the colorimeter 1 and the measurement value A1 of the glossmeter 2 are obtained. Meanwhile, by measuring the specific samples S to S5 with a reference machine of a glossmeter not integrated with a colorimeter, the measurement value A0 of the reference machine is obtained. In this way, from a relationship between the measurement value x of the colorimeter 1 and the measurement error y of the glossmeter 2 (=measurement value A1 of the glossmeter 2−measurement value A0 of the reference machine) obtained from the specific samples S1 to S5, a gloss value of an arbitrary sample can be corrected. When the diffuse reflection surface is formed of an integrating sphere, the relationship between the measurement value x and the measurement error y can be determined to some extent by a relational expression of a quadratic function as in Specific Example 2. When the diffuse reflection surface is not formed of an integrating sphere, the relationship is not necessarily expressed by a quadratic function, and therefore the correction tables may be complemented by straight lines.

Figure 7:
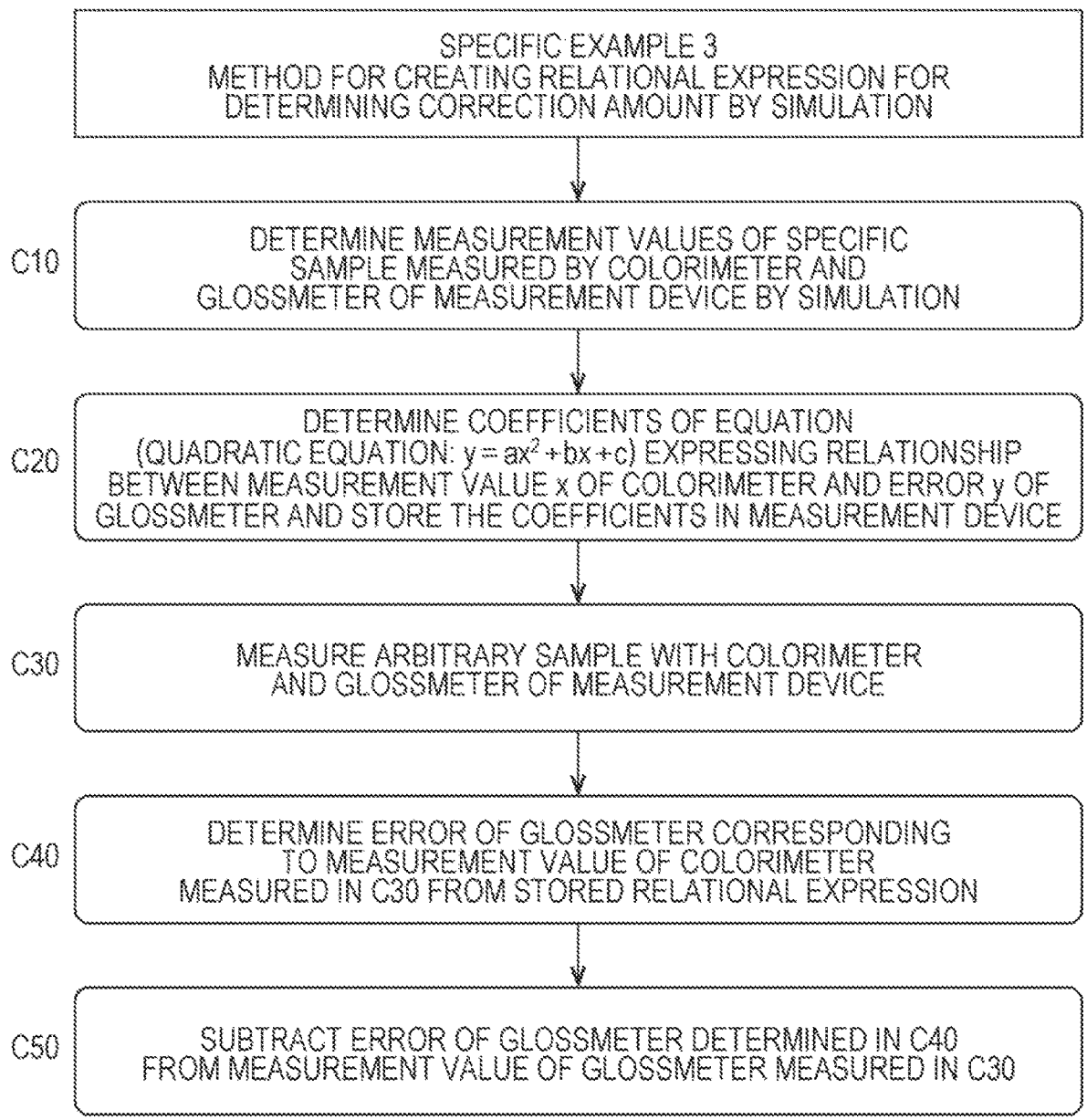
FIG. 7 is a flowchart illustrating a procedure of Specific Example 3 in which a relational expression is created by simulating a specific sample and a measurement value of a glossmeter is corrected.
Figure 8:
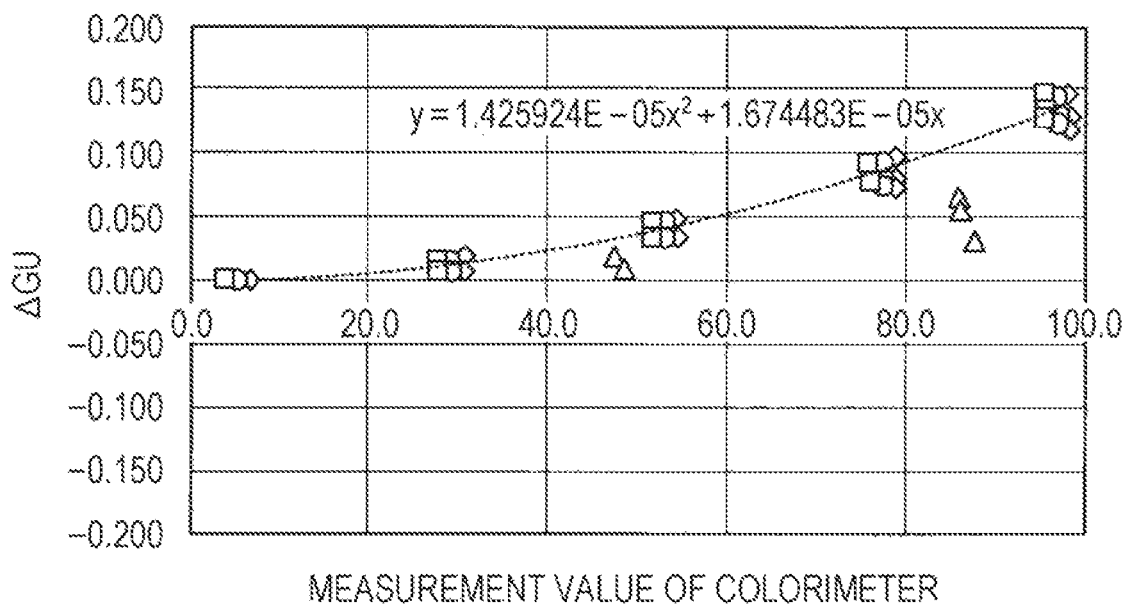
FIG. 8 is a graph illustrating a relationship between a measurement value of a colorimeter and a measurement error of a glossmeter under measurement condition 1.
Figure 9:
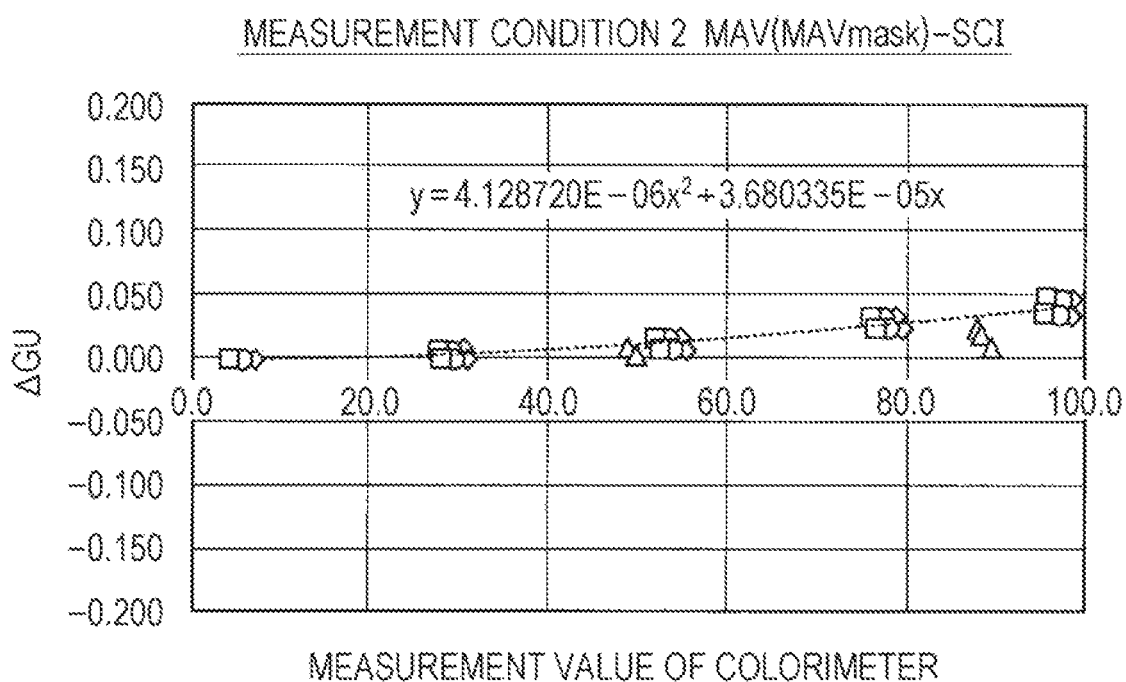
FIG. 9 is a graph illustrating a relationship between a measurement value of a colorimeter and a measurement error of a glossmeter under measurement condition 2.
Figure 10:
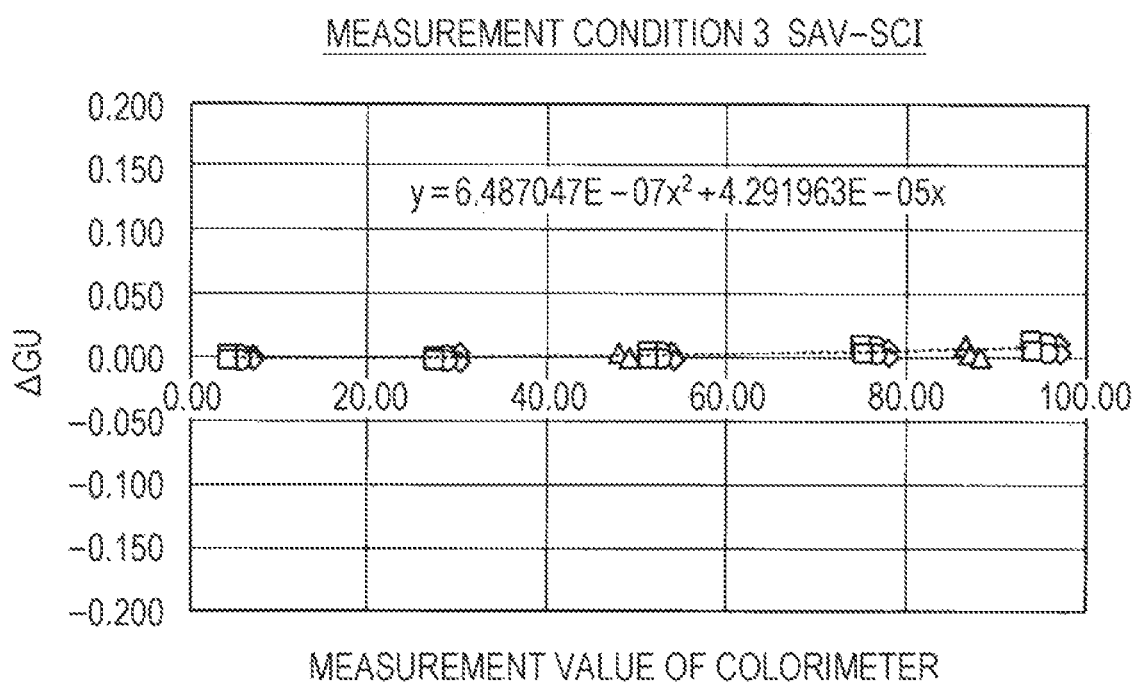
FIG. 10 is a graph illustrating a relationship between a measurement value of a colorimeter and a measurement error of a glossmeter under measurement condition 3.
Figure 11:
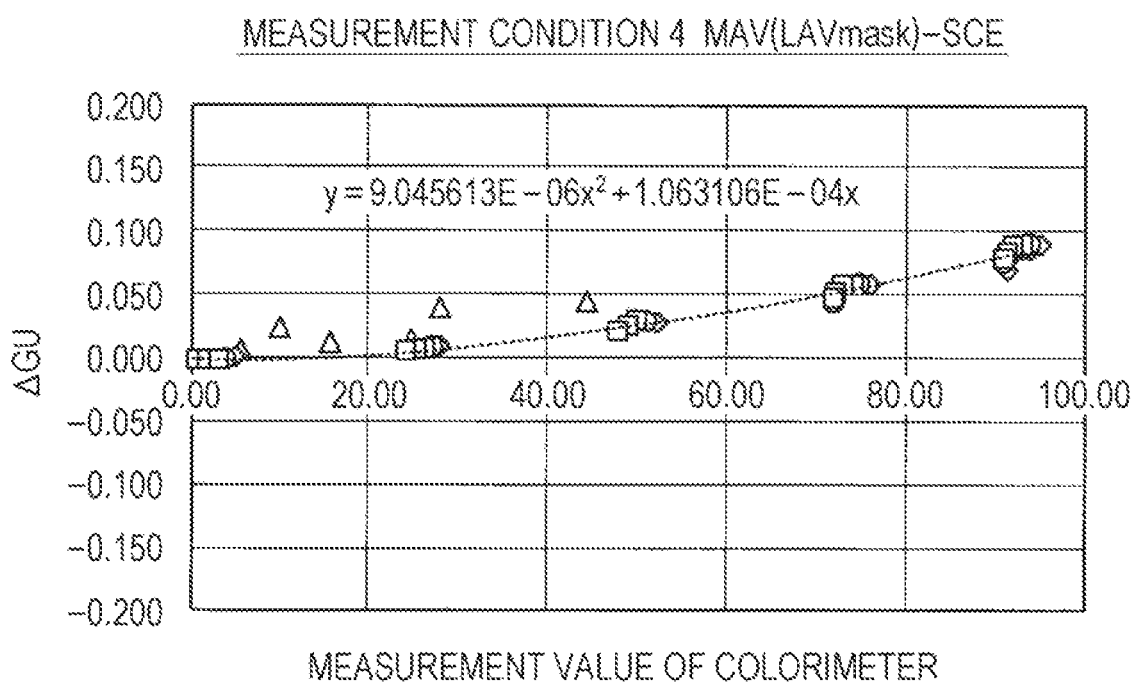
FIG. 11 is a graph illustrating a relationship between a measurement value of a colorimeter and a measurement error of a glossmeter under measurement condition 4.
Figure 12:
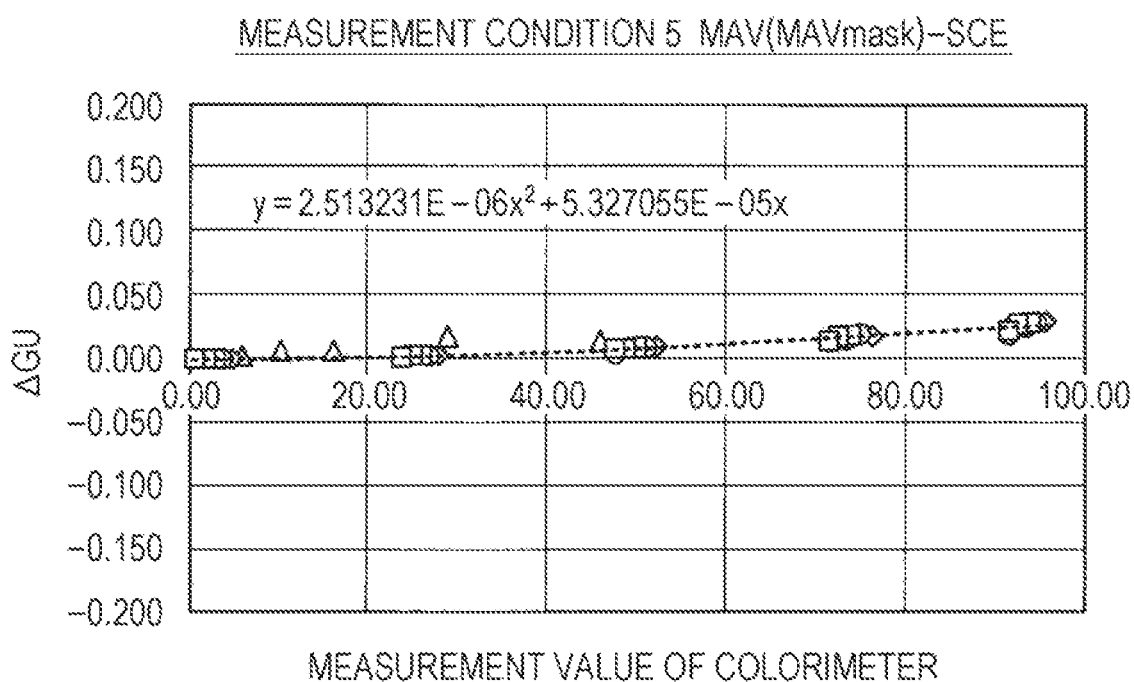
FIG. 12 is a graph illustrating a relationship between a measurement value of a colorimeter and a measurement error of a glossmeter under measurement condition 5.
Figure 13:
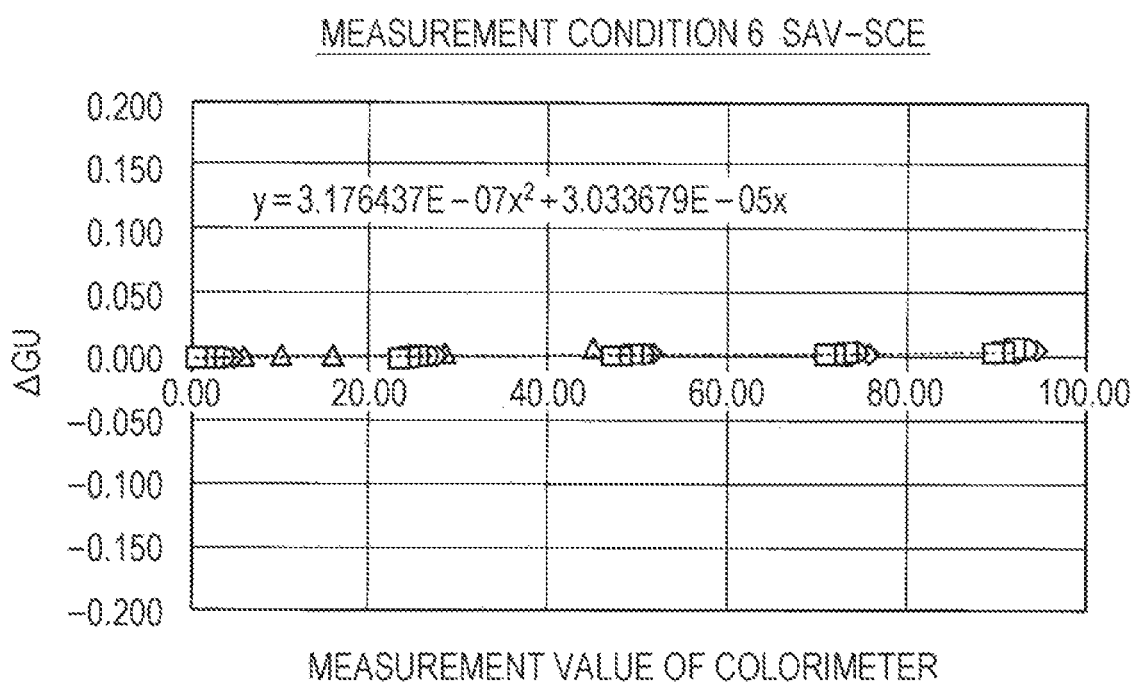
FIG. 13 is a graph illustrating a relationship between a measurement value of a colorimeter and a measurement error of a glossmeter under measurement condition 6.
Figure 14:
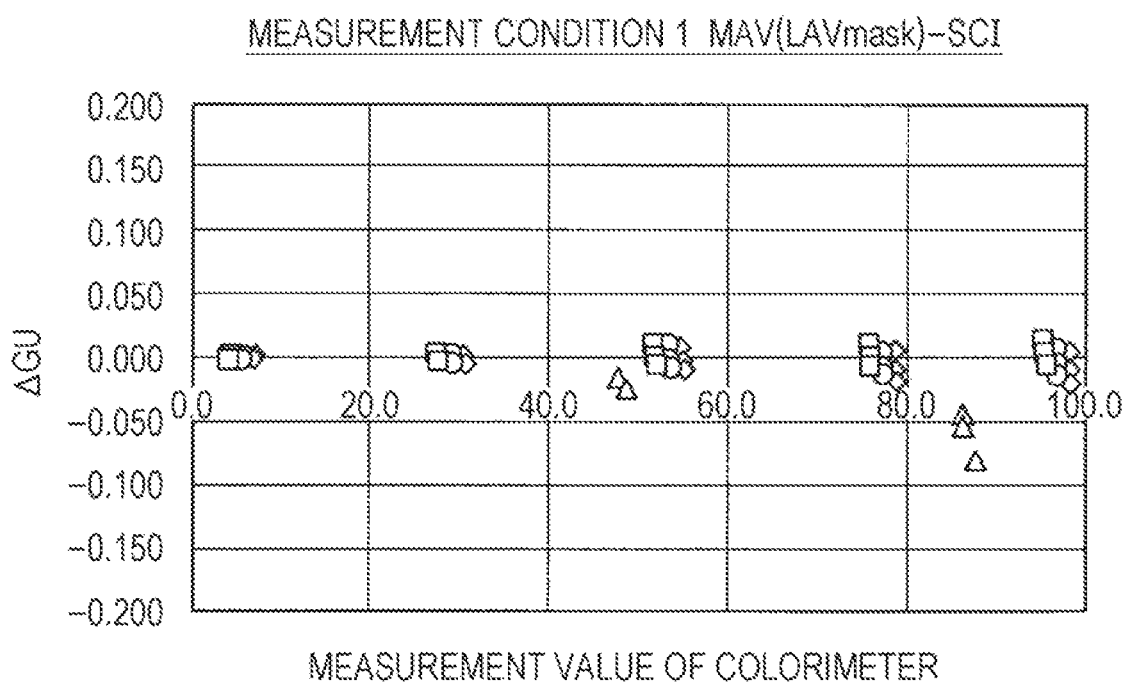
FIG. 14 is a graph illustrating a relationship between a measurement value of a colorimeter and a correction residual of a glossmeter under measurement condition 1.
Figure 15:
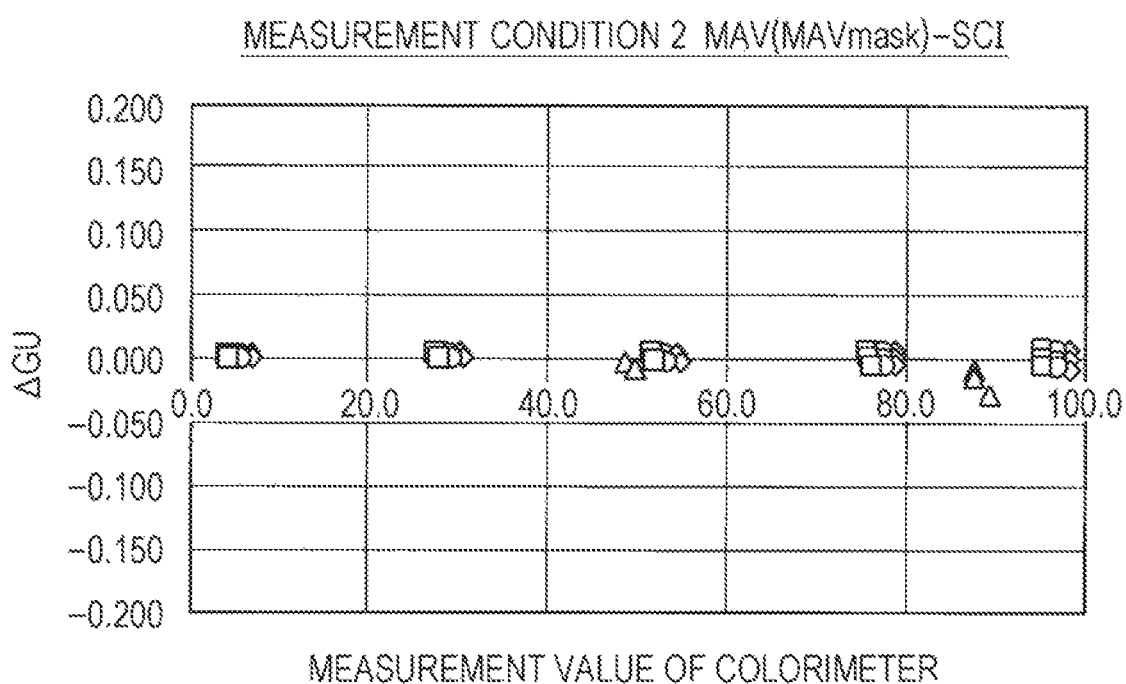
FIG. 15 is a graph illustrating a relationship between a measurement value of a colorimeter and a correction residual of a glossmeter under measurement condition 2.
Figure 16:
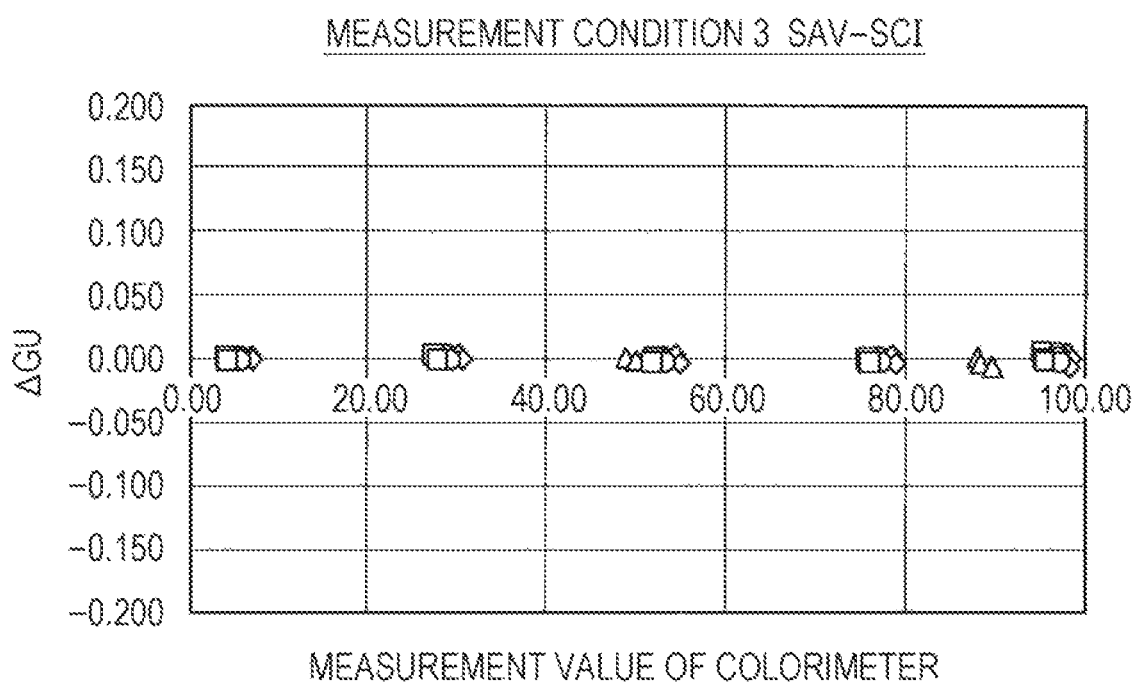
FIG. 16 is a graph illustrating a relationship between a measurement value of a colorimeter and a correction residual of a glossmeter under measurement condition 3.
Figure 17:
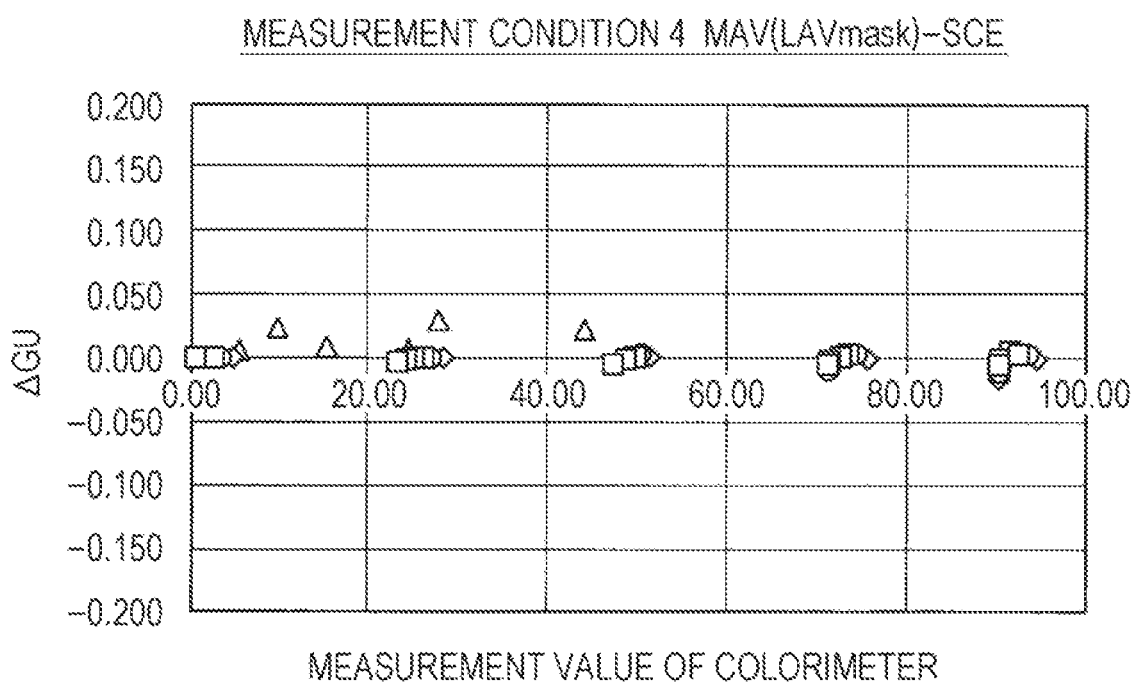
FIG. 17 is a graph illustrating a relationship between a measurement value of a colorimeter and a correction residual of a glossmeter under measurement condition 4.
Figure 18:
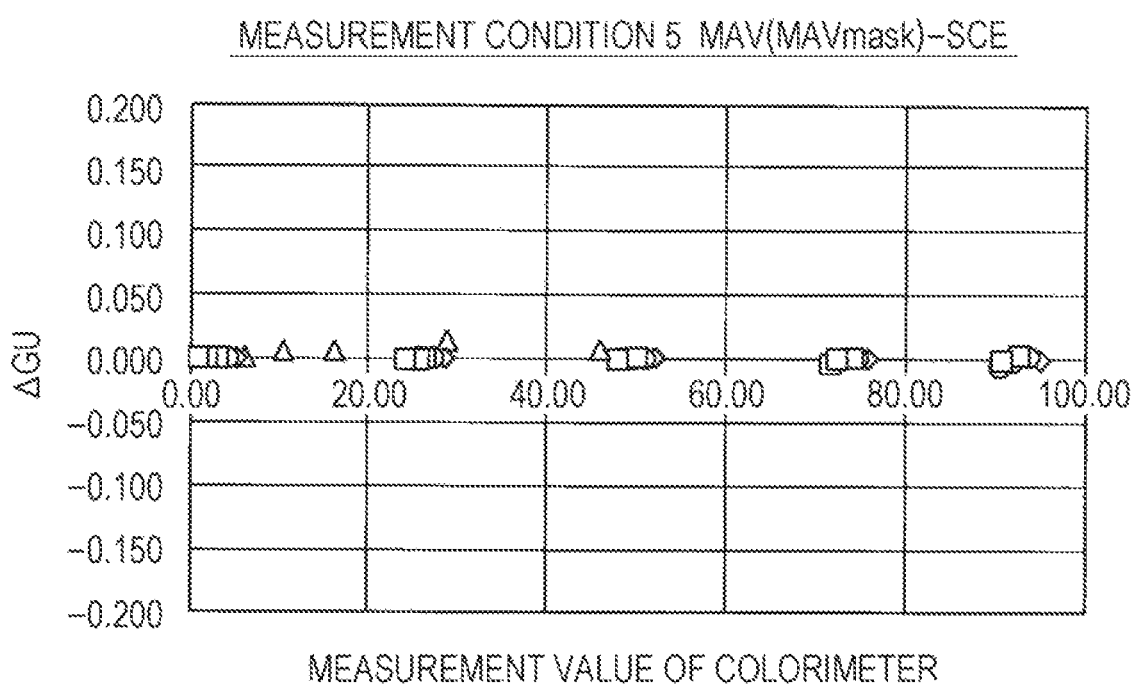
FIG. 18 is a graph illustrating a relationship between a measurement value of a colorimeter and a correction residual of a glossmeter under measurement condition 5.
Figure 19:
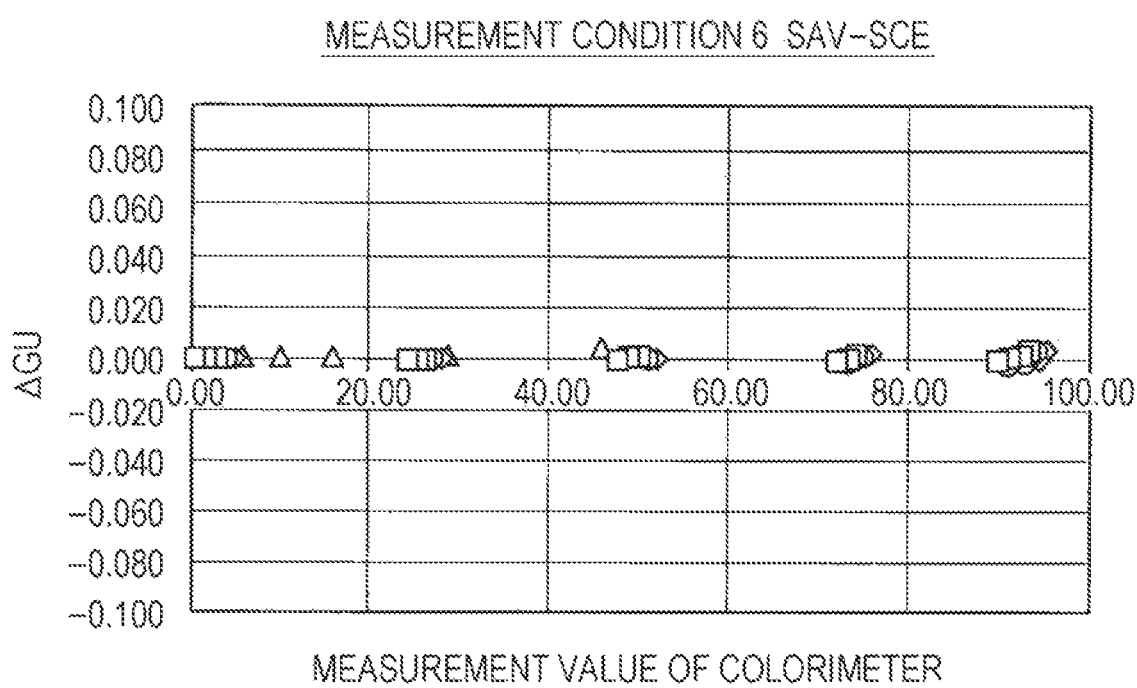
FIG. 19 is a graph illustrating a relationship between a measurement value of a colorimeter and a correction residual of a glossmeter under measurement condition 6.

The flowchart of FIG. 7 illustrates a procedure of Specific Example 3. First, a light reflectance (color value) and a gloss value obtained by measuring the specific samples S1 to S5 with the colorimeter 1 and the glossmeter 2, respectively, are determined by simulation (C10). Coefficients a, b, and c of an expression (quadratic equation: $y=ax^2+bx+c$) expressing a relationship between a measurement value x of the colorimeter 1 and a measurement error y of the glossmeter 2 are determined and stored in the storage unit 6 as a relational expression (C20). A spectral reflectance and a gloss value of an arbitrary sample that is the measurement target SP are measured with the colorimeter 1 and the glossmeter 2, respectively (C30). The measurement error y of the glossmeter 2 corresponding to the measurement value (C30) of the arbitrary sample with the colorimeter 1 is determined from the relational expression (C20) of the storage unit 6 (C40). From the measurement value (C30) of the arbitrary sample with the glossmeter 2, the measurement error (C40) of the glossmeter 2 determined from the relational expression is subtracted as a correction amount (C50). In this way, the measurement value obtained in the glossmeter 2 can be corrected based on the relational expression including the measurement value x obtained in the colorimeter 1.

The measurement values (Table 1. FIG. 4) of the specific samples S1 to S5 are calculated with the colorimeter 1 and the glossmeter 2 by actual measurement in Specific Example 2, but by simulation in Specific Example 3. In Specific Example 2, a relational expression is created based on the actual measurement values of the specific samples S1 to S5 and correction is performed. Therefore, even when the optical characteristic measurement device 100 has an assembly variation or the like depending on a device individual, the difference can also be corrected. Meanwhile, in Specific Example 3, a relational expression for determining a correction amount is created by simulation and correction is performed, and therefore the same value is applied to any measurement device. Therefore, when the optical characteristic measurement device 100 has an assembly variation or the like depending on a device individual, the difference cannot be dealt with. However, if a plurality of correction tables or relational expressions is prepared and the most suitable correction table or relational expression can be selected therefrom, a difference in the measurement condition of the colorimeter 1, the material of the measurement target SP, or the like can be dealt with.

Table 2 illustrates parameters of the measurement target SP assumed in Specific Example 3. As a material of the measurement target SP, glass, plastic, and metal were assumed, and samples having different refractive indices and surface reflectances were assumed. The reflection spread angle θ is a spread angle of surface scattered reflected light L3 (FIG. 3). It is assumed that a spread component in a simulation model forms a normal distribution having an arbitrary reflection spread angle θ with respect to an angle formed with a regular reflection direction as a standard deviation (a reflection spread angle θ=0° indicates regular reflection).

TABLE 2

| Assumed material | Refractive index | 60° Surface scattering reflectance | Reflection spread angle θ (°) | Diffuse reflectance |
|---|---|---|---|---|
| Glass or plastic | 1.46 | 8.2% | 0, 2, 6, 8, 10 | 0.5, 25, 50, 75, 95% |
|  | 1.56 | 10.0% |  |  |
|  | 1.66 | 11.4% |  |  |
| Metal | — | 50% | 4, 6, 8 | 0% |
|  | — | 90% |  |  |

Table 3 illustrates measurement conditions 1 to 6 of the colorimeter 1 and the glossmeter 2. Under measurement conditions 1 to 6, the condition of the colorimeter 1 includes a measurement diameter (measurement range, mm), either SCI (including regular reflected light) or SCE (excluding regular reflected light), and measurement opening diameter (mm). The condition of the glossmeter 2 includes a measurement diameter (measurement range, mm). In the optical characteristic measurement device 100, it is assumed that the measurement conditions 1 to 6 can be selected, and the correction table or the relational expression differs depending on a measurement condition. Therefore, the correction table or the relational expression is determined for each of the measurement conditions 1 to 6 and a gloss value is corrected. Note that colorimetry including regular reflected light (SCI) and colorimetry excluding regular reflected light (SCE) are switched by opening/closing a trap 14b (FIG. 1). The trap 14b is closed for colorimetry including regular reflected light (the regular reflected light is kept inside the integrating sphere 14), and the trap 14b is opened for colorimetry excluding regular reflected light (the regular reflected light is emitted out of the integrating sphere 14).

TABLE 3

| | | Condition of colorimeter 1 | | | Condition of glossmeter 2 Measurement diameter |
|---|---|---|---|---|---|
| | | Measurement diameter | Regular reflection | Measurement opening diameter | |
| Measurement condition 1 | MAV (LAVmask) - SCI | φ 25 mm | including | φ 30 mm | φ 10 mm |
| Measurement condition 2 | MAV (MAVmask) - SCI | φ 8 mm | including | φ 11 mm | φ 10 mm |
| Measurement condition 3 | SAV - SCI | φ 4 mm | including | φ 7 mm | φ 3 mm |
| Measurement condition 4 | MAV (LAVmask) - SCE | φ 25 mm | excluding | φ 30 mm | φ 10 mm |
| Measurement condition 5 | MAV (MAVmask) - SCE | φ 8 mm | excluding | φ 11 mm | φ 10 mm |
| Measurement condition 6 | SAV - SCE | φ 4 mm | excluding | φ 7 mm | φ 3 mm |

In order to confirm a correction effect, parameters of the measurement target SP (Table 2) and measurement conditions 1 to 6 (Table 3) were set, and the measurement values of the colorimeter 1 and the glossmeter 2 were simulated. Results thereof are illustrated in graphs of FIGS. 8 to 13. The graphs of FIGS. 8 to 13 illustrate a relationship between a measurement value of the colorimeter 1 and a measurement error of the glossmeter 2. A correction residual obtained by correcting a gloss value using the relational expressions in FIGS. 8 to 13 is illustrated in the graphs of FIGS. 14 to 19.

In the graphs of FIGS. 8 to 19,
Horizontal axis: measurement value of the colorimeter 1 (reflectance),
Vertical axis: measurement error ΔGU of the glossmeter 2,
Square plot: glass refractive index 1.46,
Circular plot: glass refractive index 1.56,
Rhombus plot: glass refractive index 1.66.
Triangle plot: metal,
Dotted line: approximate curve (quadratic equation) in a measurement value of a glass material (circular plot).
Relational expression in each of the graphs: numerical expression of an approximate curve,
MAV: gloss measurement diameter Φ10 mm,
SAV: gloss measurement diameter Φ3 mm,
LAVmask: measurement opening diameter Φ30 mm,
MAVmask: measurement opening diameter Φ11 mm.
SCI: measurement (colorimetry) including regular reflection, and
SCE: measurement (colorimetry) excluding regular reflection.

The correction residual illustrated in each of the graphs of FIGS. 14 to 19 is a measurement error that remains even if a gloss value is corrected by determining a correction amount with the relational expression indicated by the dotted line in each of FIGS. 8 to 13 ([value of each plot]−[value of dotted line]). Here, since the correction amount is determined based on a measurement value of glass, the gloss value of the glass material is satisfactorily corrected, but the correction residual is large for a part of metal. If a correction table or a relational expression for metal correction is also stored in the storage unit 6 and a user can select a correction table or a relational expression that differs depending on a material of the measurement target SP, a gloss value of metal can also be satisfactorily corrected. Regarding the measurement conditions 1 to 6, similar conditions to those for the material of the measurement target SP are also applied. That is, if a correction table or a relational expression that differs among the measurement conditions 1 to 6 is stored in the storage unit 6 and a user can select a correction table or a relational expression that differs among the measurement conditions 1 to 6, correction can be performed satisfactorily under the appropriate measurement conditions 1 to 6.

Figure 20:
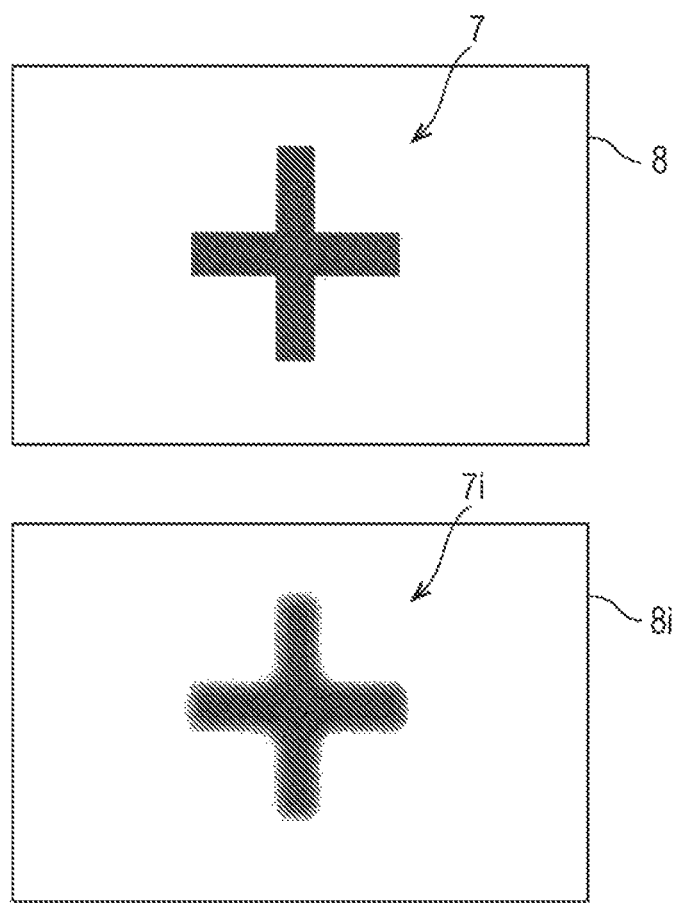
FIG. 20 is a diagram illustrating a mark attached to an inner surface of an integrating sphere of the optical characteristic measurement device of FIG. 1 and an imaged image thereof.

In order to be able to select a correction table or a relational expression according to the material of the measurement target SP, as illustrated in FIG. 2, the optical characteristic measurement device 100 includes an imaging device 3 for imaging the measurement target SP and a mark 7 positioned so as to be observed by the imaging device 3 through reflection by the measurement target SP. As illustrated in FIG. 20, the mark 7 has a size fitting within an imaging range 8 and has a reflectance different from that of a surrounding area thereof. Note that the mark 7 assumed here is drawn on an inner wall of the integrating sphere 14 so as to form a black cross shape, but a cross-shaped hole may be formed in the integrating sphere 14.

The imaging device 3 is a camera for visually recognizing the measurement target SP, and simultaneously images an image at the time of measurement with the colorimeter 1. If the measurement surface Sa of the measurement target SP is a mirror surface (θ=0°), the mark 7 in the imaging range 8 in the integrating sphere 14 is imaged by the imaging device 3 as it is through reflection by the measurement target SP. If the measurement surface Sa of the measurement target SP is a rough surface (θ>0°), reflection in a regular reflection direction is not specular reflection but surface scattering reflection and has a spread (FIG. 3). Therefore, an edge of the mark 7 is imaged as an unclear mark image 7i like an imaged image 8i illustrated in FIG. 20.

Figure 21:
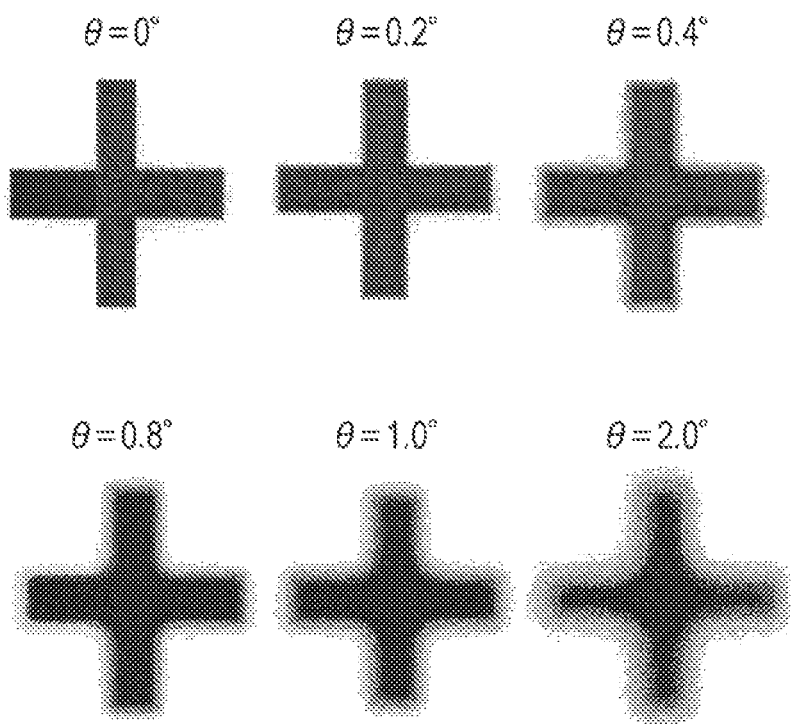
FIG. 21 is a diagram illustrating a relationship between deterioration of the mark image of FIG. 20 and a reflection spread angle θ.
Figure 22:
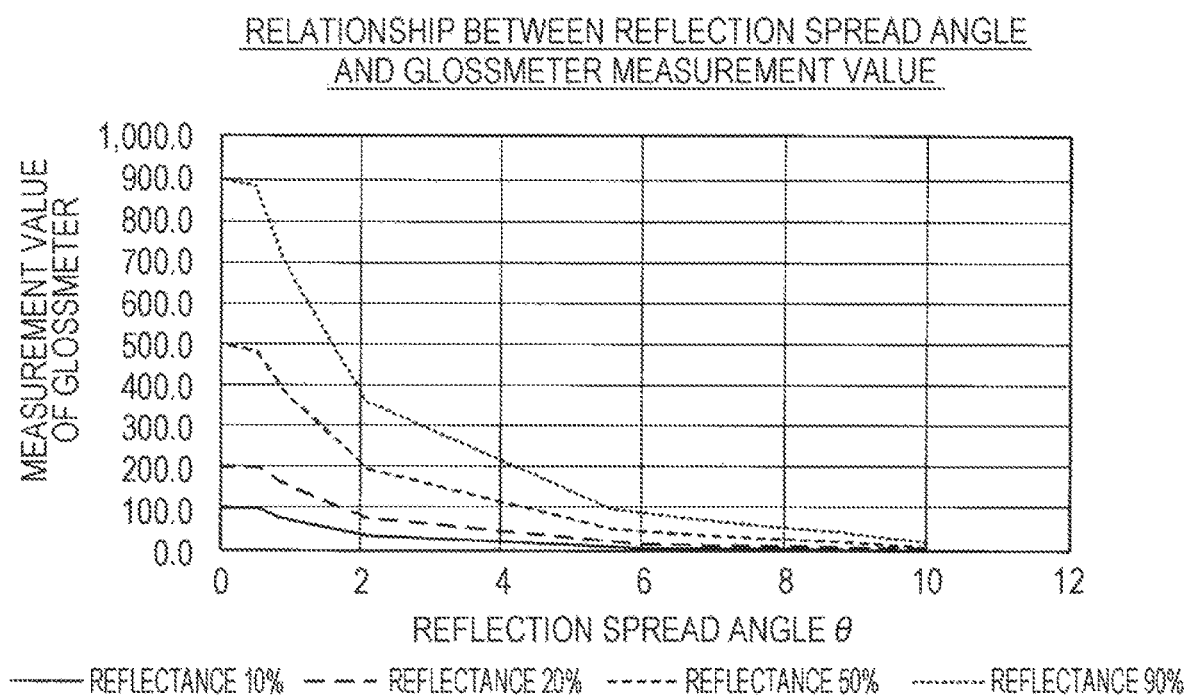
FIG. 22 is a graph illustrating a relationship between the reflection spread angle θ of FIG. 21 and a glossmeter measurement value.

FIG. 21 illustrates a relationship between deterioration of the mark image 7i and the reflection spread angle θ. The graph of FIG. 22 illustrates a relationship between the reflection spread angle θ and a measurement value of the glossmeter 2. As illustrated in FIGS. 21 and 22, a relationship between the reflection spread angle θ and deterioration of the mark image 7i is determined by simulation in advance and stored in the storage unit 6, and the reflection spread angle θ is determined from the imaged image 8i. A relationship among the reflection spread angle θ, a measurement value of the glossmeter 2, and a surface reflectance is also determined by simulation in advance and stored in the storage unit 6. Since the reflection spread angle θ and the measurement value of the glossmeter 2 are known, the surface reflectance of the measurement target SP can be estimated approximately. Then, by selecting a correction table or a relational expression based on the estimated surface reflectance, a gloss value can be satisfactorily corrected.

For example, in measurement of a gloss value in the colorimeter 1, the processing unit 5 acquires an image with the imaging device 3 and determines the degree of image deterioration of the measurement target SP from the obtained imaged image 8i by image processing and calculates the reflection spread angle θ. The material of the measurement target SP is estimated from the reflection spread angle θ calculated by the processing unit 5 and the measurement value of the glossmeter 2, and a correction table or a relational expression according to the material is selected and applied.

When the colorimetric light source 10 of the colorimeter 1 and the gloss light source 20 of the glossmeter 2 have different spectral radiances, light received by the sensor 19 of the colorimeter 1 and light received by the sensor 27 of the glossmeter 2 have different optical spectra. In some measurement targets SP, a reflectance varies depending on a wavelength. Therefore, when a measurement value (gloss value) output from light received by the glossmeter 2 is corrected by a measurement value (color value) output from light received by the colorimeter 1, incorrect correction may be performed. In order to solve this, the optical spectrum obtained by multiplying the spectral radiance of the light source 10 by the spectral sensitivity of the sensor 19 is made the same as the optical spectrum obtained by multiplying the spectral radiance of the light source 20 by the spectral sensitivity of the sensor 27. This makes the same measurement target SP receive the same optical spectrum, and therefore correct correction can be performed even with the different light sources 10 and 20.

Figure 23:
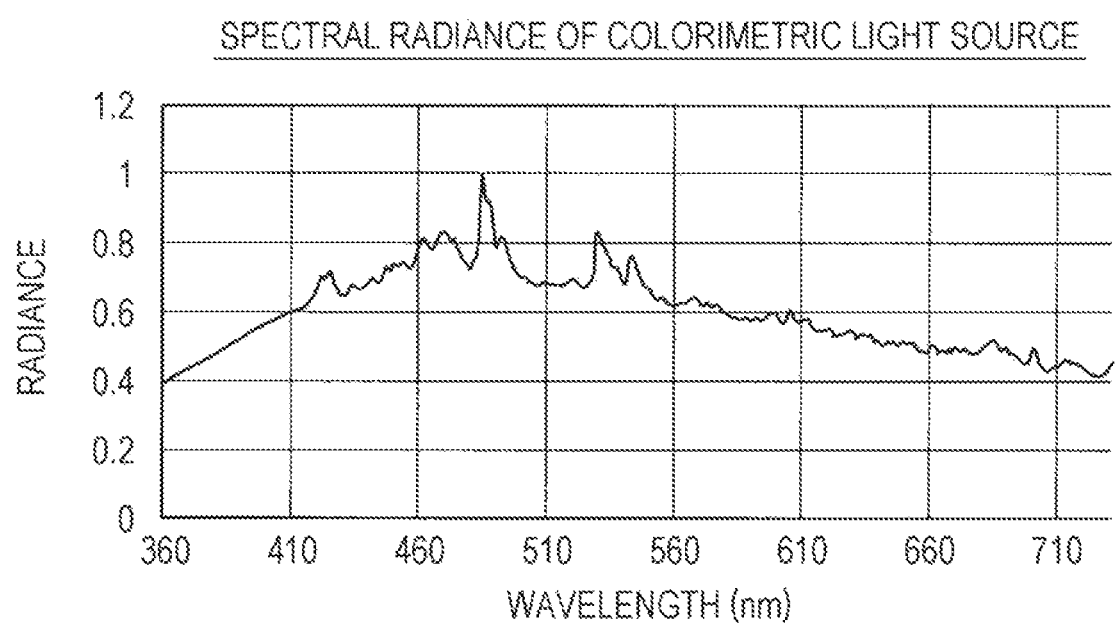
FIG. 23 is a graph illustrating the spectral radiance of a colorimetric light source.
Figure 24:
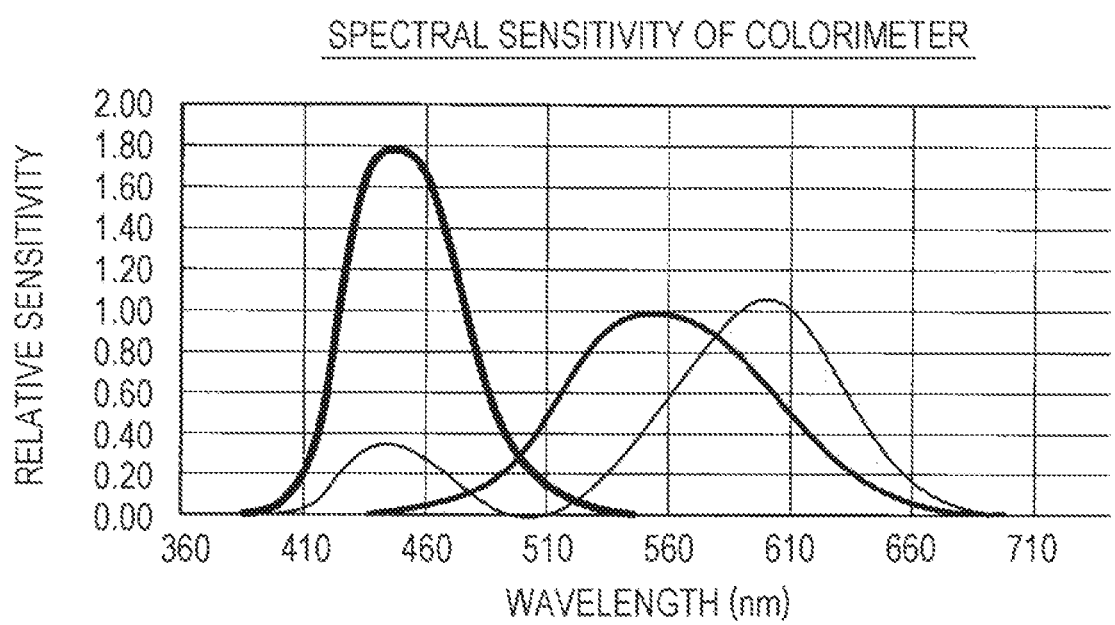
FIG. 24 is a graph illustrating the spectral sensitivity of a colorimeter.
Figure 25:
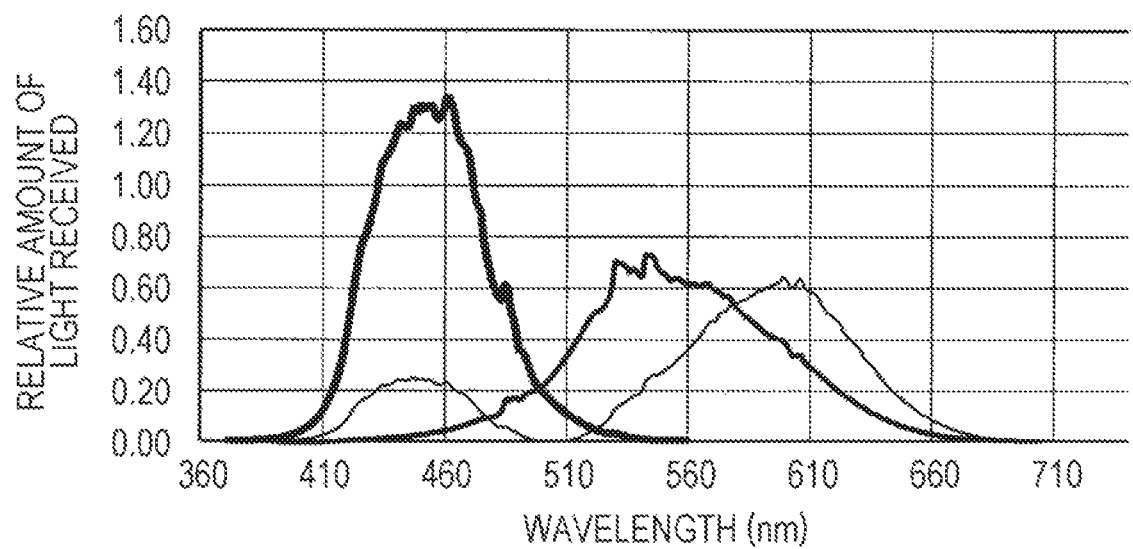
FIG. 25 is a graph illustrating the spectral radiance× spectral sensitivity in a colorimeter.
Figure 26:
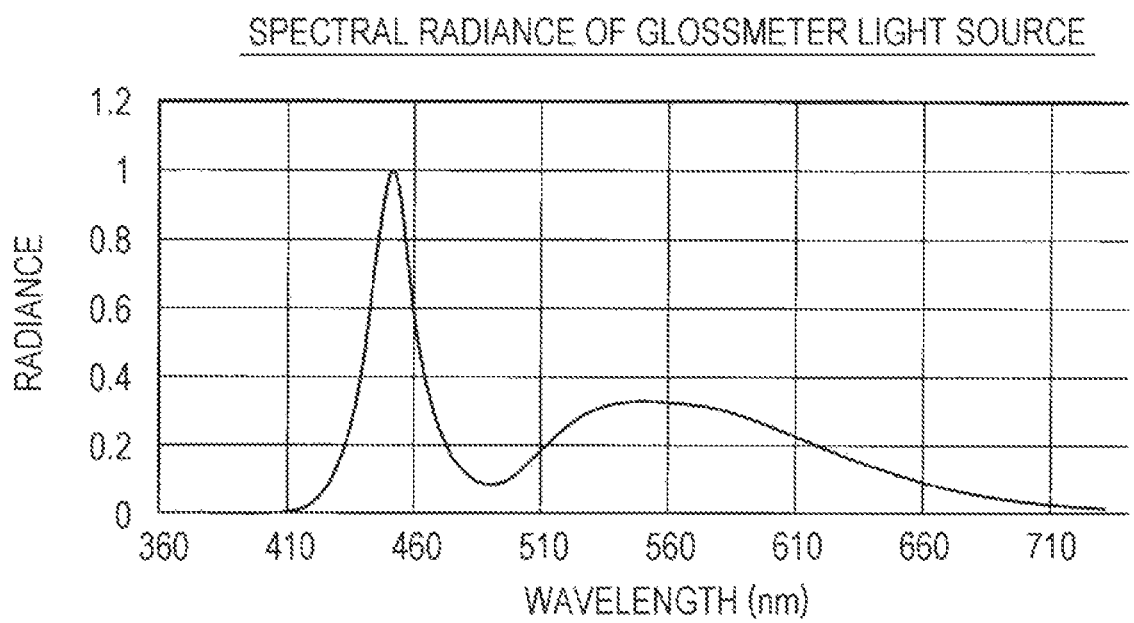
FIG. 26 is a graph illustrating the spectral radiance of a gloss light source.
Figure 27:
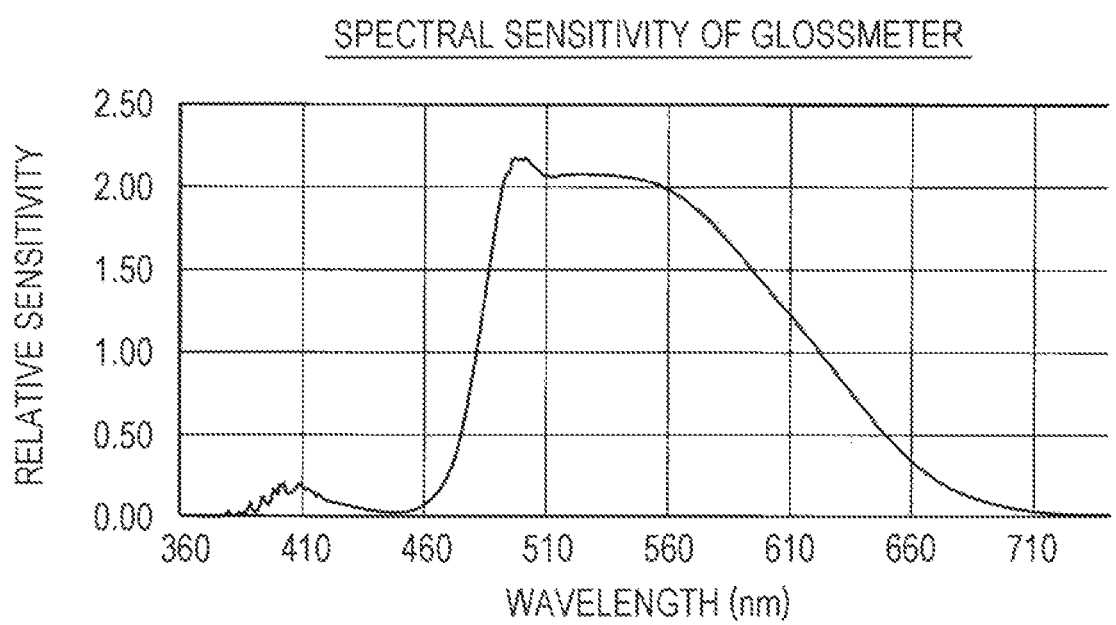
FIG. 27 is a graph illustrating the spectral sensitivity of a glossmeter.
Figure 28:
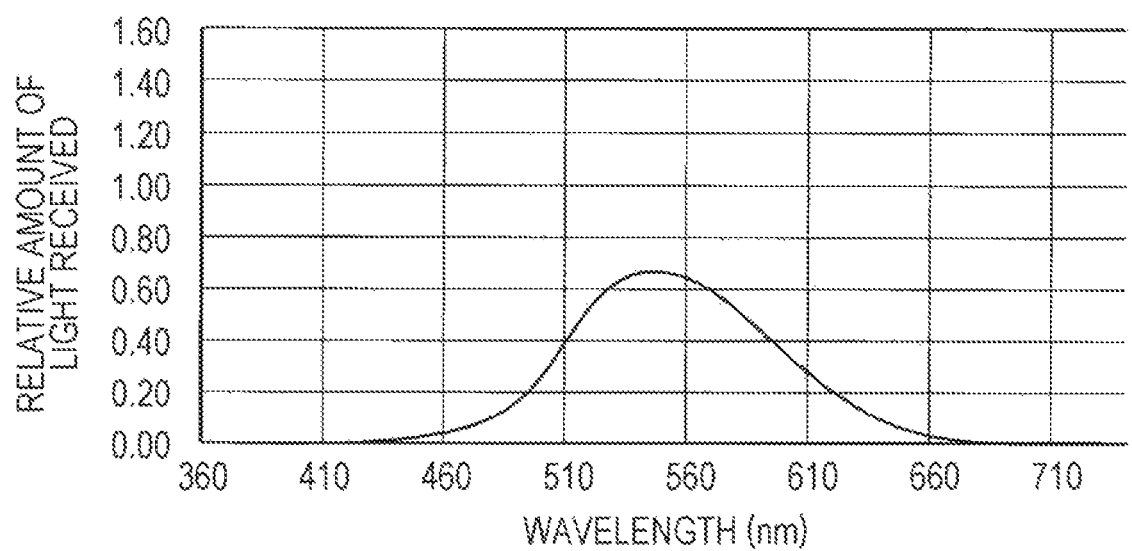
FIG. 28 is a graph illustrating the spectral radiance× spectral sensitivity in a glossmeter.

Here, a case where the colorimetric light source 10 is a xenon flash lamp and the gloss light source 20 is a white light emitting diode (LED) is considered. FIG. 23 illustrates the spectral radiance of the colorimetric light source 10. FIG. 24 illustrates the spectral sensitivity of the colorimeter 1. FIG. 25 illustrates the spectral radiance×spectral sensitivity in the colorimeter 1. FIG. 26 illustrates the spectral radiance of the gloss light source 20. FIG. 27 illustrates the spectral sensitivity of the glossmeter 2. FIG. 28 illustrates the spectral radiance×spectral sensitivity in the glossmeter 2.

In the colorimeter 1 and the glossmeter 2, the amount of light received by the sensor 19, 27 in the light receiving unit 13, 23 can be expressed by the following formula (F1).

$$O=\int B(\lambda) \cdot R(\lambda) \cdot f(\lambda) d\lambda \quad (F1)$$

in which
O: amount of light received by sensor.
B(λ): spectral radiance of light source.
R(λ): spectral reflectance of measurement target, and
f(λ): spectral sensitivity of sensor.

When the colorimeter 1 is a tristimulus value type (stimulus value direct reading type), as illustrated in FIG. 24, the colorimetric light receiving unit 13 includes the sensor 19 having three spectral sensitivities of CIE color matching functions x, y, and z defined in "JIS Z 8781". The spectral sensitivity of the glossmeter 2 (FIG. 27) is adjusted according to the spectral radiance×spectral sensitivity in the colorimeter 1 (FIG. 25). Since the adjustment corresponds to matching B(λ)·f(λ) between the colorimeter 1 and the glossmeter 2, the measurement conditions are matched, and correct correction can be performed regardless of the spectral reflectance R(λ) of the measurement target SP. That is, even if the spectral reflectance R(λ) of the measurement target SP is unknown, making a product of the spectral radiance B(λ) of the colorimetric light source 10 and spectral sensitivity f(λ) of the sensor 19 equal to a product of the spectral radiance B(λ) of the gloss light source 20 and the spectral sensitivity f(λ) of the sensor 27 corresponds to receiving the same spectrum. Therefore, a measurement value of the glossmeter 2 can be corrected using a measurement value of the colorimeter 1.

In the colorimeter 1 of a different type from the above, correct correction can be performed even with the different light sources 10 and 20. That is, if the optical spectrum of light reflected from the measurement target SP can be measured with the colorimeter 1, by dividing the optical spectrum by the spectroscopic spectrum of the light source, the spectral reflectance R(λ) of the measurement target SP can be obtained. By multiplying the spectral reflectance R(λ) of the measurement target SP by the spectrum of the light source 20 of the glossmeter 2, an optical spectrum equivalent to that measured with the colorimeter 1 can be obtained using the gloss light source 20. Therefore, correct correction can be performed even with the different light sources 10 and 20.

Figure 29:
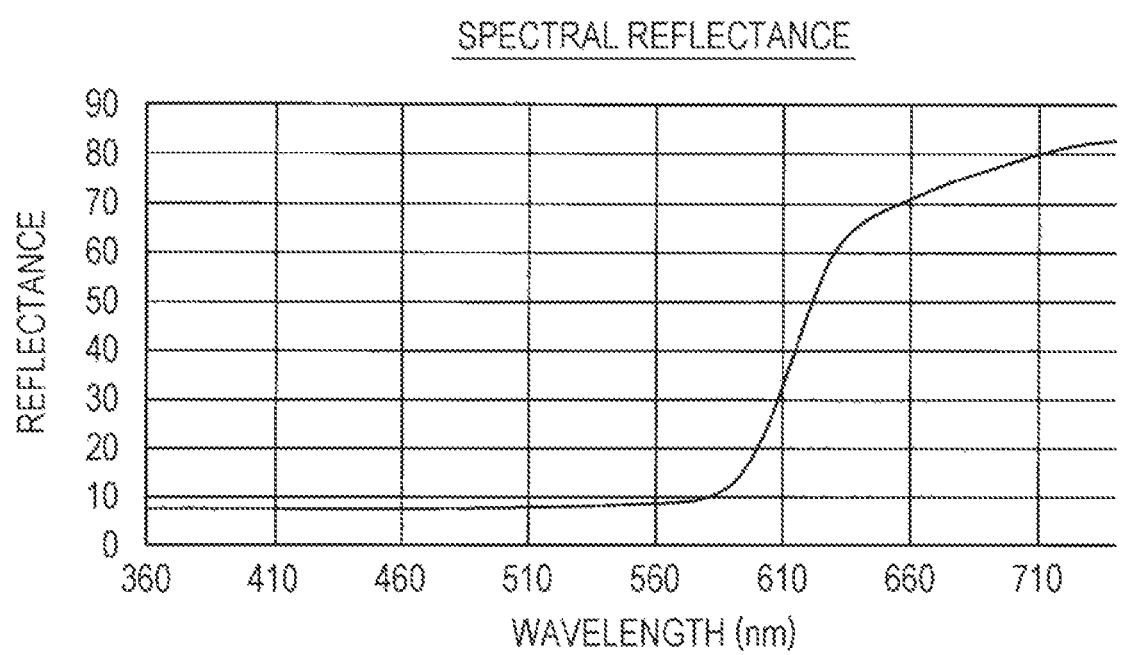
FIG. 29 is a graph illustrating the spectral reflectance of a measurement target.

The graph of FIG. 29 illustrates an example of the spectral reflectance R(λ) of the measurement target SP. When the colorimeter 1 is a spectral type (spectral colorimeter), the spectral reflectance R(λ) of the measurement target SP is obtained as illustrated in FIG. 29. R(λ) is known in formula (F1). Therefore, if the amount O of light received, determined using B(λ)·f(λ) of the glossmeter 2 is a measurement value of the colorimeter 1, the amount O of light received can be regarded as a measurement value under the same conditions as the glossmeter 2. In the colorimeter 1, the colorimetric light receiving unit 13 includes a diffraction grating 18 that disperses light reflected by the measurement target SP. Therefore, the processing unit 5 uses the optical spectrum obtained by the diffraction grating 18 for measuring optical characteristics, and correct correction can be thereby performed even with different light sources 10 and 20.

The optical characteristic measurement device 100 described above can measure a spectral reflectance (color value) and a gloss value, and can measure the gloss value with high accuracy even if retro-diffusive illumination on the measurement surface Sa of the measurement target SP occurs in the measurement of the gloss value by the diffuse reflection surface 14a used in the measurement of the color value. Since a measurement value obtained in the glossmeter 2 is corrected based on a measurement value obtained in the colorimeter 1, it is not necessary to dispose a light source or a sensor separately for correction, and shortage of the amount of illumination light that causes a decrease in correction accuracy does not occur. Therefore, in the measurement of the gloss value with the glossmeter 2, highly accurate measurement can be performed at low cost even if retro-diffusive illumination on the measurement surface Sa occurs by the diffuse reflection surface 14a used in the measurement of the color value with the colorimeter 1.

Note that the illumination optical system 11 has the diffuse reflection surface 14a in the integrating sphere 14 in the optical characteristic measurement device 100, and a similar effect to the above can be obtained even when the colorimetric light receiving optical system 12 has a diffuse reflection surface. From a positional relationship between the colorimetric light source 10 and the light receiving slit 16, it is possible to replace the illumination optical system 11 and the colorimetric light receiving optical system 12 with each other. Therefore, for example, the measurement surface Sa may be illuminated with parallel light, and light reflected therefrom may be received through the integrating sphere 14.

For example, when the measurement target SP has a strong reflection angle characteristic in a regular reflection direction, the light amount of the retro-diffusive illumination largely changes depending on whether a diffuse reflection surface involved in the retro-diffusive illumination is in a reflection direction thereof. Light that has entered the integrating sphere 14 is repeatedly reflected on an inner surface thereof to uniformly illuminate the inner surface of the integrating sphere 14. When the diffuse reflection surface 14a involved in retro-diffusive illumination includes the integrating sphere 14 as in the optical characteristic measurement device 100, light that has not entered the glossmeter 2 contributes to the retro-diffusive illumination of the measurement target SP uniformly. Therefore, the light amount of the retro-diffusive illumination is determined according to the reflectance of the diffused reflected light regardless of the reflection angle characteristic of the measurement target SP. Therefore, the same correction table or relational expression can be used for correction regardless of the reflection angle characteristic.

In the optical characteristic measurement device 100, the light projecting optical system 21 projects substantially parallel light inclined by 60° with respect to the normal line N of a measurement surface. Therefore, by receiving light in a regular reflection direction thereof, the glossmeter 2 can have a configuration of a glossmeter conforming to industrial standards such as JIS.

In the optical characteristic measurement device 100, a measurement value of each of the specific samples S1 to S5 is calculated with the colorimeter 1 and the glossmeter 2 in advance by actual measurement or simulation, a relationship between each of the measurement values of the specific samples S1 to S5 obtained by the colorimeter 1 and a measurement error included in each of the measurement values of the specific samples S1 to S5 obtained by the glossmeter 2 is stored as a correction table or a relational expression, and the measurement value of a measurement target obtained by the colorimeter 1 is applied to the correction table or the relational expression to determine a correction amount of the measurement value of the glossmeter 2. Therefore, even if the error amount generated in the glossmeter 2 cannot be estimated from the measurement value of the colorimeter 1, the measurement value of the glossmeter 2 can be corrected with high accuracy.

In the optical characteristic measurement device 100, a plurality of measurement conditions can be set in the colorimeter 1, a plurality of correction tables or relational expressions is set so as to differ depending on a measurement condition, and a correction table or a relational expression can be selected therefrom. Since a surface reflectance differs depending on a measurement condition, a relationship between a measurement value measured in the colorimeter 1 and a measurement error generated in the glossmeter 2 also differs. Therefore, by creating a different correction table or relational expression in advance according to a measurement condition to make it possible to perform correction according to the measurement condition, the correction accuracy can be improved.

In the optical characteristic measurement device 100, a plurality of correction tables or relational expressions is set so as to differ depending on a material of the measurement target SP, and a correction table or a relational expression can be selected therefrom. Since a surface reflectance differs depending on a material, a relationship between a measurement value measured in the colorimeter 1 and a measurement error generated in the glossmeter 2 also differs. Therefore, by creating a different correction table or relational expression in advance according to a material to make it possible to perform correction according to the material, the correction accuracy can be improved.

The optical characteristic measurement device 100 includes the imaging device 3 for imaging the measurement target SP and the mark 7 positioned so as to be observed by the imaging device 3 through reflection by the measurement target SP, having a size fitting within the imaging range 8, and having a reflectance different from that of a surrounding area thereof. In addition, the processing unit 5 acquires an image with the imaging device 3 in measurement of optical characteristics in the colorimeter 1 or the glossmeter 2 (for example, when the colorimetric light source 10 or the gloss light source 20 emits light), determines the degree of image deterioration of the measurement target SP from the obtained imaged image 8i by image processing to calculate a diffuse reflection characteristic, estimates the material of the measurement target SP from the calculated diffuse reflection characteristic and the measurement value of the measurement target SP obtained by the colorimeter 1 or the glossmeter 2, and selects and applies a correction table or a relational expression according to the material of the measurement target SP.

According to this method, when the measurement target SP is a mirror, the imaged image S1 obtained by the imaging device 3 is an image obtained by observing the other side through reflection by the measurement target SP. Since the illumination optical system 11 of the colorimeter 1 includes the integrating sphere 14, a part of the inner wall of the integrating sphere 14 is observed through the mirror. Since the mark 7 having a different reflectance from that of the integrating sphere 14 (for example, the black cross mark in FIG. 20) is attached to the inner wall of the integrating sphere 14, the image 7i of the mark 7 is imaged.

However, when the measurement surface Sa of the measurement target SP is a diffuse reflection surface such as a rough surface, light is diffused and reflected by the measurement target SP, and therefore the mark image 7i is blurred. By comparing the mark image 7i imaged with the measurement target SP as a mirror in advance with the mark image 7i imaged with an arbitrary measurement target SP, spread of diffuse reflection of the measurement target SP or the like can be estimated. Furthermore, by combining the measurement values measured by the colorimeter 1 or the glossmeter 2, a reflection characteristic of the measurement target SP can be roughly estimated, and therefore an optimum correction table or relational expression can be selected.

In the optical characteristic measurement device 100, a product of the spectral radiance of the colorimetric light source 10 and the spectral sensitivity of the colorimetric light receiving unit 13 is equal to a product of the spectral radiance of the gloss light source 20 and the spectral sensitivity of the gloss light receiving unit 23. When the colorimetric light source 10 has a different spectral radiance from the gloss light source 20, light received by the sensor 19 of the colorimetric light receiving unit 13 has a different optical spectrum from light received by the sensor 27 of the gloss light receiving unit 23. In some measurement targets SP, a reflectance varies depending on a wavelength. Therefore, when a measurement value output from light received by the gloss light receiving unit 23 is corrected by a measurement value output from light received by the colorimetric light receiving unit 13, incorrect correction may be performed. As described above, by making the optical spectrum obtained by multiplying the spectral radiance of the light source 10 by the spectral sensitivity of the light receiving unit 13 same as the optical spectrum obtained by multiplying the spectral radiance of the light source 20 by the spectral sensitivity of the light receiving unit 23, the same optical spectrum is received for the same measurement target SP. Therefore, correct correction can be performed even with different light sources 10 and 20. Note that when the colorimetric light receiving unit 13 has a plurality of spectral sensitivities because of having a plurality of sensors 19, if at least one of the sensitivities satisfies the same spectral radiance×spectral sensitivity as the spectral radiance of the light source 20×the spectral sensitivity of the light receiving unit 23, a measurement value of the glossmeter 2 can be correctly corrected using a measurement value of the colorimetric light receiving unit 13.

In the optical characteristic measurement device 100, the colorimetric light receiving unit 13 includes the diffraction grating 18 as a spectroscopic element that disperses light reflected by the measurement target SP, and the processing unit 5 uses an optical spectrum obtained by the diffraction grating 18 for measuring optical characteristics. If the optical spectrum of the reflected light can be measured, by dividing the optical spectrum by the optical spectrum of the light source 10, the spectral reflectance of the measurement target SP is obtained. By multiplying the spectral reflectance of the measurement target SP by the spectrum of the gloss light source 20, an optical spectrum equivalent to that measured with the colorimeter 1 can be obtained using the gloss light source 20, and therefore correct correction can be performed.

As can be seen from the above description, the above-described embodiment includes the following characteristic configurations (#1) to (#9).

(#1): An optical characteristic measurement device having a measurement opening and including a first optical measurement unit and a second optical measurement unit that measure different optical characteristics with different geometries with respect to a measurement target facing the measurement opening, in which the first optical measurement unit includes an illumination optical system that illuminates the measurement target facing the measurement opening, a first light receiving optical system that collects light reflected by the measurement target, and a first light receiving unit that receives light collected by the first light receiving optical system and outputs the light as a measurement signal, and has a diffuse reflection surface that diffuses and reflects incident light to the illumination optical system or the first light receiving optical system, and the second optical measurement unit includes a light projecting optical system that projects light from a direction inclined by a predetermined angle with respect to a normal line of a measurement surface of the measurement target facing the measurement opening, a second light receiving optical system that collects light reflected by the measurement target in a regular reflection direction, and a second light receiving unit that receives light collected by the second light receiving optical system and outputs the light as a measurement signal, the optical characteristic measurement device further including a processing unit that corrects a measurement value obtained in the second optical measurement unit based on a measurement value obtained in the first optical measurement unit.

(#2): The optical characteristic measurement device according to (#1), in which the diffuse reflection surface is formed of an integrating sphere.

(#3): The optical characteristic measurement device according to (#1) or (#2), in which the light projecting optical system projects substantially parallel light inclined by 60° with respect to the normal line of the measurement surface.

(#4): The optical characteristic measurement device according to any one of (#1) to (#3), in which a measurement value of a specific sample is calculated by the first optical measurement unit and the second optical measurement unit in advance by actual measurement or simulation, a relationship between the measurement value of the specific sample obtained by the first optical measurement unit and a measurement error included in the measurement value of the specific sample obtained by the second optical measurement unit is stored as a correction table or a relational expression, and the measurement value of the measurement target obtained by the first optical measurement unit is applied to the correction table or the relational expression to determine a correction amount of the measurement value of the second optical measurement unit.

(#5): The optical characteristic measurement device according to (#4), in which a plurality of measurement conditions can be set in the first optical measurement unit, a plurality of the correction tables or relational expressions is set so as to differ depending on a measurement condition, and a correction table or a relational expression can be selected therefrom.

(#6): The optical characteristic measurement device according to (#4) or (#5), in which a plurality of the correction tables or relational expressions is set so as to differ depending on a material of the measurement target, and a correction table or a relational expression can be selected therefrom.

(#7): The optical characteristic measurement device according to any one of (#4) to (#6), further including an imaging device for imaging the measurement target and a mark positioned so as to be observed by the imaging device through reflection by the measurement target, having a size fitting within an imaging range, and having a reflectance different from that of a surrounding area thereof, in which the processing unit acquires an image with the imaging device in measurement of optical characteristics in the first optical measurement unit or the second optical measurement unit, determines the degree of image deterioration of the measurement target from the obtained image by image processing to calculate a diffuse reflection characteristic, estimates the material of the measurement target from the calculated diffuse reflection characteristic and the measurement value of the measurement target obtained by the first optical measurement unit or the second optical measurement unit, and selects and applies the correction table or relational expression according to the material of the measurement target.

(#8): The optical characteristic measurement device according to any one of (#1) to (#7), in which the first optical measurement unit further includes a first light source that radiates light for illumination, the second optical measurement unit further includes a second light source that radiates light for projection, and a product of the spectral radiance of the first light source and the spectral sensitivity of the first light receiving unit is equal to a product of the spectral radiance of the second light source and the spectral sensitivity of the second light receiving unit.

(#9): The optical characteristic measurement device according to any one of (#1) to (#7), in which the first light receiving unit includes a spectroscopic element that disperses light reflected by the measurement target, and the processing unit uses an optical spectrum obtained in the spectroscopic element for measuring optical characteristics.

REFERENCE SIGNS LIST

1 Colorimeter (first optical measurement unit)
2 Glossmeter (second optical measurement unit)
3 Imaging device
4 Measurement opening
5 Processing unit
6 Storage unit
7 Mark
7i Mark image
8 Imaging range
8i Imaged image
10 Colorimetric light source (first light source)
11 Illumination optical system
12 Colorimetric light receiving optical system (first light receiving optical system)
13 Colorimetric light receiving unit (first light receiving unit)
14 Integrating sphere
14a Diffuse reflection surface
14b Trap
15 Light receiving lens
16 Light receiving slit
17a. 17b Lens
18 Diffraction grating
19 Sensor
20 Gloss light source (second light source)
21 Light projecting optical system
22 Gloss light receiving optical system (second light receiving optical system)
23 Gloss light receiving unit (second light receiving unit)
24 Light projecting lens
25 Light receiving lens
26 Optical filter
27 Sensor
28a Light projecting opening
28b Light receiving opening
100 Optical characteristic measurement device
L1 Incident light
L2 Regular reflected light
L3 Surface scattered reflected light
L4 Diffused reflected light
NL Normal line of measurement surface
SS Substance surface
SP Measurement target
Sa Measurement surface

The invention claimed is:

1. An optical characteristic measurement device having a measurement opening and comprising a first optical measurer and a second optical measurer that measure different optical characteristics with different geometries with respect to a measurement target facing the measurement opening, wherein the first optical measurer includes an illumination optical system that illuminates the measurement target facing the measurement opening, a first light receiving optical system that collects light reflected by the measurement target, and a first light receiver that receives light collected by the first light receiving optical system and outputs the light as a measurement signal, and has a diffuse reflection surface that diffuses and reflects incident light to the illumination optical system or the first light receiving optical system, the second optical measurer includes a light projecting optical system that projects light from a direction inclined by a predetermined angle with respect to a normal line of a measurement surface of the measurement target facing the measurement opening, a second light receiving optical system that collects light reflected by the measurement target in a regular reflection direction, and a second light receiver that receives light collected by the second light receiving optical system and outputs the light as a measurement signal, the optical characteristic measurement device further comprises a hardware processor that corrects a measurement value obtained in the second optical measurer based on a measurement value obtained in the first optical measurer, and a measurement value of a specific sample is calculated by the first optical measurer and the second optical measurer in advance by actual measurement or simulation, a relationship between the measurement value of the specific sample obtained by the first optical measurer and a measurement error included in the measurement value of the specific sample obtained by the second optical measurer is stored as a correction table or a relational expression, and the measurement value of the measurement target obtained by the first optical measurer is applied to the correction table or the relational expression to determine a correction amount of the measurement value of the second optical measurer.

2. The optical characteristic measurement device according to claim 1, wherein the diffuse reflection surface is formed of an integrating sphere.

3. The optical characteristic measurement device according to claim 2, wherein the light projecting optical system projects substantially parallel light inclined by 60° with respect to the normal line of the measurement surface.

4. The optical characteristic measurement device according to claim 2, wherein the first light receiver includes a spectroscopic element that disperses light reflected by the measurement target, and the hardware processor uses an optical spectrum obtained in the spectroscopic element for measuring optical characteristics.

5. The optical characteristic measurement device according to claim 1, wherein the light projecting optical system projects substantially parallel light inclined by 60° with respect to the normal line of the measurement surface.

6. The optical characteristic measurement device according to claim 5, wherein the first light receiver includes a spectroscopic element that disperses light reflected by the measurement target, and the hardware processor uses an optical spectrum obtained in the spectroscopic element for measuring optical characteristics.

7. The optical characteristic measurement device according to claim 1, wherein a plurality of measurement conditions can be set in the first optical measurer, a plurality of the correction tables or relational expressions is set so as to differ depending on a measurement condition, and a correction table or a relational expression can be selected therefrom.

8. The optical characteristic measurement device according to claim 7, wherein a plurality of the correction tables or relational expressions is set so as to differ depending on a material of the measurement target, and a correction table or a relational expression can be selected therefrom.

9. The optical characteristic measurement device according to claim 7, further comprising an imaging device for imaging the measurement target and a mark positioned so as to be observed by the imaging device through reflection by the measurement target, having a size fitting within an imaging range, and having a reflectance different from that of a surrounding area thereof, wherein the hardware processor acquires an image with the imaging device in measurement of optical characteristics in the first optical measurer or the second optical measurer, determines a degree of image deterioration of the measurement target from the obtained image by image processing to calculate a diffuse reflection characteristic, estimates a material of the measurement target from the calculated diffuse reflection characteristic and the measurement value of the measurement target obtained by the first optical measurer or the second optical measurer, and selects and applies the correction table or relational expression according to the material of the measurement target.

10. The optical characteristic measurement device according to claim 1, wherein a plurality of the correction tables or relational expressions is set so as to differ depending on a material of the measurement target, and a correction table or a relational expression can be selected therefrom.

11. The optical characteristic measurement device according to claim 1, further comprising an imaging device for imaging the measurement target and a mark positioned so as to be observed by the imaging device through reflection by the measurement target, having a size fitting within an imaging range, and having a reflectance different from that of a surrounding area thereof, wherein the hardware processor acquires an image with the imaging device in measurement of optical characteristics in the first optical measurer or the second measurer, determines a degree of image deterioration of the measurement target from the obtained image by image processing to calculate a diffuse reflection characteristic, estimates a material of the measurement target from the calculated diffuse reflection characteristic and the measurement value of the measurement target obtained by the first optical measurer or the second optical measurer, and selects and applies the correction table or relational expression according to the material of the measurement target.

12. The optical characteristic measurement device according to claim 1, wherein the first light receiver includes a spectroscopic element that disperses light reflected by the measurement target, and the hardware processor uses an optical spectrum obtained in the spectroscopic element for measuring optical characteristics.

13. An optical characteristic measurement device having a measurement opening and comprising a first optical measurer and a second optical measurer that measure different optical characteristics with different geometries with respect to a measurement target facing the measurement opening, wherein the first optical measurer includes an illumination optical system that illuminates the measurement target facing the measurement opening, a first light receiving optical system that collects light reflected by the measurement target, and a first light receiver that receives light collected by the first light receiving optical system and outputs the light as a measurement signal, and has a diffuse reflection surface that diffuses and reflects incident light to the illumination optical system or the first light receiving optical system, the second optical measurer includes a light projecting optical system that projects light from a direction inclined by a predetermined angle with respect to a normal line of a measurement surface of the measurement target facing the measurement opening, a second light receiving optical system that collects light reflected by the measurement target in a regular reflection direction, and a second light receiver that receives light collected by the second light receiving optical system and outputs the light as a measurement signal, the optical characteristic measurement device further comprises a hardware processor that corrects a measurement value obtained in the second optical measurer based on a measurement value obtained in the first optical measurer, and the first optical measurer further includes a first light source that radiates light for illumination, the second optical measurer further includes a second light source that radiates light for projection, and a product of a spectral radiance of the first light source and a spectral sensitivity of the first light receiver is equal to a product of a spectral radiance of the second light source and a spectral sensitivity of the second light receiver.

* * * * *